(12) United States Patent
Yonezawa et al.

(10) Patent No.: US 7,948,407 B2
(45) Date of Patent: *May 24, 2011

(54) HIGH-SPEED SERIAL INTERFACE CIRCUIT AND ELECTRONIC INSTRUMENT

(75) Inventors: Takemi Yonezawa, Fujimi (JP); Kenichi Oe, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/649,677

(22) Filed: Dec. 30, 2009

(65) Prior Publication Data

US 2010/0103002 A1   Apr. 29, 2010

Related U.S. Application Data

(63) Continuation of application No. 12/196,553, filed on Aug. 22, 2008, now Pat. No. 7,663,515.

(30) Foreign Application Priority Data

Sep. 7, 2007   (JP) ................................ 2007-232292

(51) Int. Cl.
  *H03M 9/00*   (2006.01)
(52) U.S. Cl. ........ 341/100; 341/101; 375/242; 375/244; 375/354; 375/358; 375/376
(58) Field of Classification Search .................. 341/100, 341/101; 326/9, 14, 82, 83; 375/242, 244, 375/354, 358, 359, 376
See application file for complete search history.

(56) References Cited

U.S. PATENT DOCUMENTS

| | | | |
|---|---|---|---|
| 5,172,397 A | 12/1992 | Llewellyn | |
| 5,570,089 A | 10/1996 | Haas | |
| 5,805,632 A * | 9/1998 | Leger | 375/282 |
| 6,031,473 A * | 2/2000 | Kubinec | 341/100 |
| 6,292,116 B1 * | 9/2001 | Wang et al. | 341/100 |
| 6,385,263 B1 | 5/2002 | Bowers et al. | |
| 6,396,888 B1 * | 5/2002 | Notani et al. | 375/364 |
| 6,593,863 B2 * | 7/2003 | Pitio | 341/101 |
| 7,020,208 B1 | 3/2006 | Yen | |
| 7,064,690 B2 * | 6/2006 | Fowler et al. | 341/101 |
| 7,222,036 B1 | 5/2007 | Thorne | |
| 7,248,122 B2 * | 7/2007 | Morrill | 331/1 A |

(Continued)

FOREIGN PATENT DOCUMENTS

JP   2004-128629   4/2004

(Continued)

*Primary Examiner* — Linh V Nguyen

(74) *Attorney, Agent, or Firm* — Harness, Dickey & Pierce, P.L.C.

(57) ABSTRACT

A high-speed serial interface circuit includes a data receiver circuit, a clock signal receiver circuit, a logic circuit block that includes at least a serial/parallel conversion circuit, a free-running clock signal generation circuit, a clock signal detection circuit, and an output mask circuit. The clock signal detection circuit compares a received clock signal from the clock signal receiver circuit with a free-running clock signal from the free-running clock signal generation circuit to detect whether or not clock signals are transferred through differential clock signal lines. When the clock signal detection circuit has detected that the clock signals are not transferred through the differential clock signal lines, the output mask circuit masks an output signal from the logic circuit block so that the output signal is not transmitted to a circuit in the subsequent stage. The present invention can prevent a partial characteristic variation by NBTI by inputting a free-running clock into a logic block, and operating it.

20 Claims, 17 Drawing Sheets

U.S. PATENT DOCUMENTS

| | | |
|---|---|---|
| 7,249,271 B2 | 7/2007 | Shibata et al. |
| 7,366,267 B1 * | 4/2008 | Lee et al. .................. 375/354 |
| 7,535,257 B2 * | 5/2009 | Shibata et al. ............... 326/82 |
| 7,577,193 B2 * | 8/2009 | Goth .......................... 375/232 |
| 7,663,515 B2 * | 2/2010 | Yonezawa et al. ........... 341/100 |
| 2001/0033188 A1 * | 10/2001 | Aung et al. ................. 327/141 |
| 2001/0053188 A1 | 12/2001 | Kumata |
| 2003/0212930 A1 | 11/2003 | Aung et al. |
| 2006/0062341 A1 | 3/2006 | Edmondson et al. |
| 2006/0140321 A1 | 6/2006 | Tell et al. |

FOREIGN PATENT DOCUMENTS

| | | |
|---|---|---|
| JP | 2005-348119 | 12/2005 |
| JP | 2006-276221 | 10/2006 |

* cited by examiner

VCP

CKDET

HIGH-SPEED SERIAL INTERFACE CIRCUIT AND ELECTRONIC INSTRUMENT

This application is a continuation of U.S. patent application Ser. No. 12/196,553 filed on Aug. 22, 2008 which claims priority to Japanese Patent Application No. 2007-232292 filed on Sep. 7, 2007, which are hereby incorporated by reference in their entirety.

BACKGROUND OF THE INVENTION

Several aspects of the present invention relate to a high-speed serial interface circuit, an electronic instrument, and the like.

In recent years, a high-speed serial transfer such as low voltage differential signaling (LVDS) has attracted attention as an interface aimed at reducing EMI noise or the like. In such a high-speed serial transfer, a transmitter circuit transmits serialized data using differential signals, and a receiver circuit differentially amplifies the differential signals to implement data transfer.

For example, JP-A-2006-276221 discloses related-art high-speed serial transfer technology. JP-A-2004-128629 discloses technology for stabilizing the output from a receiver circuit when a high-speed serial transfer cable has been removed, for example.

According to the technology disclosed in JP-A-2004-128629, signal lines other than differential signal lines (serial bus) must be provided in order to stabilize the output from the receiver circuit. This increases the number of signal lines provided between the transmitter circuit and the receiver circuit.

Moreover, these related-art technologies are silent about measures that reduce negative bias temperature instability (NBTI) (i.e., a temporal change in transistor characteristics), and a variation in characteristics due to hot carriers in a high-speed serial interface circuit.

SUMMARY

According to one aspect of the invention, there is provided a high-speed serial interface circuit comprising:

a data receiver circuit that receives differential-signal serial data transferred through differential data signal lines, and outputs received serial data;

a clock signal receiver circuit that receives differential clock signals transferred through differential clock signal lines, and outputs a received clock signal;

a logic circuit block that includes at least a serial/parallel conversion circuit, the serial/parallel conversion circuit sampling the received serial data from the data receiver circuit based on a sampling clock signal generated using the received clock signal from the clock signal receiver circuit, and converting the sampled received serial data into parallel data;

a free-running clock signal generation circuit that generates a free-running clock signal, and outputs the generated free-running clock signal;

a clock signal detection circuit that compares the received clock signal from the clock signal receiver circuit with the free-running clock signal from the free-running clock signal generation circuit to detect whether or not the clock signals are transferred through the differential clock signal lines; and an output mask circuit that masks an output signal from the logic circuit block to prevent the output signal from being transmitted to a circuit in a subsequent stage when the clock signal detection circuit has detected that the clock signals are not transferred through the differential clock signal lines.

According to another aspect of the invention, there is provided an electronic instrument comprising:

the above high-speed serial interface circuit; and
a device that operates based on data or a clock signal received by the high-speed serial interface circuit.

DETAILED DESCRIPTION OF THE EMBODIMENT

Figure 1:
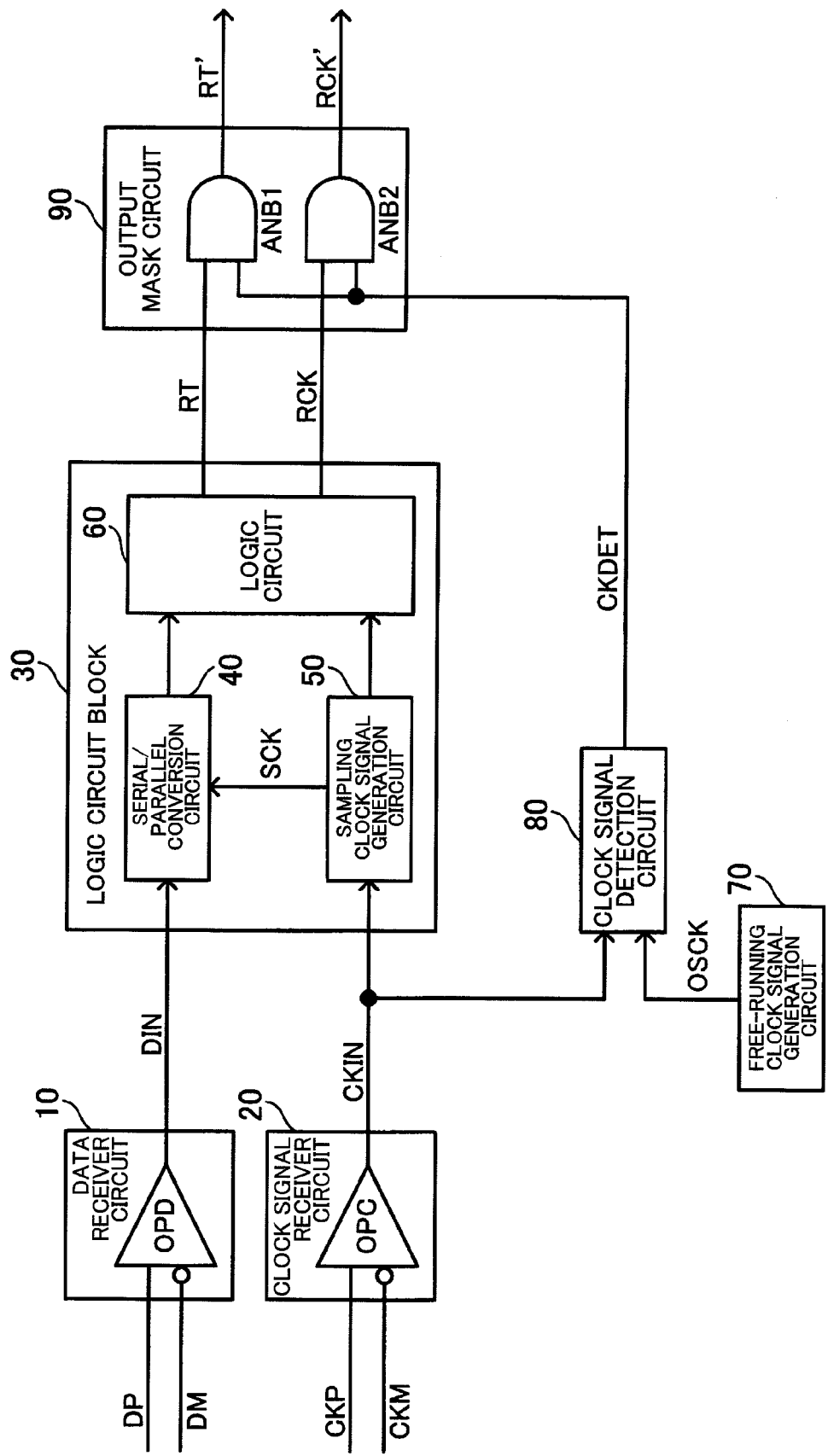
FIG. 1 shows a first configuration example of a high-speed serial interface circuit according to one embodiment of the invention.

Several aspects of the invention may provide a high-speed serial interface circuit capable of preventing an unstable operation when a clock signal is not transferred, and an electronic instrument including the same.

According to one embodiment of the invention, there is provided a high-speed serial interface circuit comprising:

a data receiver circuit that receives differential-signal serial data transferred through differential data signal lines, and outputs received serial data;

a clock signal receiver circuit that receives differential clock signals transferred through differential clock signal lines, and outputs a received clock signal;

a logic circuit block that includes at least a serial/parallel conversion circuit, the serial/parallel conversion circuit sampling the received serial data from the data receiver circuit based on a sampling clock signal generated using the received clock signal from the clock signal receiver circuit, and converting the sampled received serial data into parallel data;

a free-running clock signal generation circuit that generates a free-running clock signal, and outputs the generated free-running clock signal;

a clock signal detection circuit that compares the received clock signal from the clock signal receiver circuit with the free-running clock signal from the free-running clock signal generation circuit to detect whether or not the clock signals are transferred through the differential clock signal lines; and an output mask circuit that masks an output signal from the logic circuit block to prevent the output signal from being transmitted to a circuit in a subsequent stage when the clock signal detection circuit has detected that the clock signals are not transferred through the differential clock signal lines.

According to this embodiment, the free-running clock signal generation circuit outputs the free-running clock signal, and the clock signal detection circuit compares the free-running clock signal with the received clock signal from the clock signal receiver circuit to detect whether or not the clock signals are transferred through the differential clock signal lines. When the clock signal detection circuit has detected that the clock signals are not transferred through the differential clock signal lines, the output mask circuit masks the output signal from the logic circuit block so that the output signal is not transmitted to a circuit in the subsequent stage. This prevents a situation in which an unstable output signal is transmitted to the circuit in the subsequent stage when the clock signals are not transferred through the differential clock signal lines, thereby preventing an unstable operation when the clock signals are not transferred through the differential clock signal lines.

In the high-speed serial interface circuit, the clock signal detection circuit may compare the frequency of the received clock signal with the frequency of the free-running clock signal, and may determine that the clock signals are not transferred through the differential clock signal lines when the frequency of the received clock signal is lower than the frequency of the free-running clock signal.

This makes it possible to detect that the clock signals are not transferred through the differential clock signal lines by merely comparing the frequency of the free-running clock signal with the frequency of the received clock signal. Therefore, the circuit configuration of the clock signal detection circuit can be simplified.

In the high-speed serial interface circuit, when the frequency of the free-running clock signal is referred to as FC, the minimum frequency of a frequency range of the clock signals transferred through the differential clock signal lines is referred to as FL, and the maximum frequency of the frequency range of the clock signals transferred through the differential clock signal lines is referred to as FH, the free-running clock signal generation circuit may generate the free-running clock signal having the frequency FC that satisfies the relationship FC<FL.

According to this configuration, when a signal having a frequency outside the frequency range between the frequency FL and the frequency. FH has been detected in the clock signal lines, the clock signal detection circuit can determine that the signal is generated based on noise or the like, and determine that the clock signals are not transferred through the differential clock signal lines.

In the high-speed serial interface circuit, the clock signal receiver circuit may receive the free-running clock signal from the free-running clock signal generation circuit, and may output the free-running clock signal to the logic circuit block instead of the received clock signal when the clock signal detection circuit has determined that the clock signals are not transferred through the differential clock signal lines.

According to this embodiment, when the clock signal detection circuit has detected that the clock signals are not transferred through the differential clock signal lines, the free-running clock signal from the free-running clock signal generation circuit is input to the logic circuit block instead of the received clock signal. Therefore, even if the clock signals are not transferred through the differential clock signal lines for a long time, the free-running clock signal is supplied to the logic circuit block as a pseudo clock signal. This reduces a variation per hour in a transistor of the logic circuit block and the like so that reliability and the like can be improved.

In the high-speed serial interface circuit, the data receiver circuit may receive the free-running clock signal from the free-running clock signal generation circuit, and may output the free-running clock signal to the logic circuit block instead of the received serial data when the clock signal detection circuit has determined that the clock signals are not transferred through the differential clock signal lines.

According to this embodiment, when the clock signal detection circuit has detected that the clock signals are not transferred through the differential clock signal lines, the free-running clock signal from the free-running clock signal generation circuit is input to the logic circuit block instead of the received serial data. Therefore, even if the data is not transferred through the differential data lines for a long time, the free-running clock signal is supplied to the logic circuit block as a pseudo received serial data. This reduces a temporal variation in a transistor of the logic circuit block and the like so that reliability and the like can be improved.

The high-speed serial interface circuit may further comprise:

a frequency detection circuit that detects the frequency of the received clock signal, and activates an operation stop signal supplied to the free-running clock signal generation circuit when the frequency of the received clock signal has exceeded a given frequency FM.

According to this configuration, since the free-running clock signal generation circuit stops operation when the frequency of the received clock signal has increased, an adverse effect of the free-running clock signal generated by the free-running clock signal generation circuit on high-speed serial transfer can be reduced.

In the high-speed serial interface circuit, the clock signal detection circuit may include:

a charge circuit that charges a charge-pump node connected to a first capacitor by a time constant corresponding to the frequency of the free-running clock signal;

a discharge circuit that discharges the charge-pump node by a time constant corresponding to the frequency of the received clock signal; and a voltage detection circuit that detects the voltage of the charge-pump node.

This makes it possible to compare the frequency of the free-running clock signal with the frequency of the received clock signal by merely detecting the voltage of the charge-pump node, whereby a clock signal detection circuit having a simple and small circuit configuration can be implemented.

In the high-speed serial interface circuit, the discharge circuit may include:

a first-conductivity-type first transistor that is provided between a first intermediate node connected to a second capacitor and a first power supply and is turned ON when the received clock signal is set at a first voltage level; and a first-conductivity-type second transistor that is provided between the charge-pump node and the first intermediate node and is turned ON when the received clock signal is set at a second voltage level; and the charge circuit may include:

a second-conductivity-type third transistor that is provided between a second intermediate node connected to a third capacitor and the charge-pump node and is turned ON when the free-running clock signal is set at the second voltage level; and a second-conductivity-type fourth transistor that is provided between a second power supply and the second intermediate node and is turned ON when the free-running clock signal is set at the first voltage level.

According to this configuration, the discharge circuit and the charge circuit can be implemented by merely providing the first to fourth transistors, the first and second capacitors, and the like, whereby a clock signal detection circuit having a small circuit configuration can be implemented.

In the high-speed serial interface circuit, the voltage detection circuit may include a Schmidt trigger circuit.

This prevents a situation in which a glitch due to noise or the like occurs in the detection signal. Therefore, malfunction can be prevented.

The high-speed serial interface circuit may further comprise:

a high impedance state detection circuit that detects a high impedance state of a first clock signal line and a second clock signal line that form the differential clock signal lines, and the output mask circuit may mask the output signal from the logic circuit block when the high impedance state detection circuit has detected the high impedance state of the first clock signal line and the second clock signal line.

According to this configuration, the output signal can be masked even if the clock signal lines are set in a high impedance state, in addition to the case where the clock signals are not transferred through the clock signal lines. Therefore, malfunction of the circuit in the subsequent stage can be prevented.

In the high-speed serial interface circuit, the high impedance state detection circuit may include:

a first pull-up resistor connected to the first clock signal line;

a second pull-up resistor connected to the second clock signal line; and a voltage detection circuit, when the minimum voltage of a common-mode input voltage range of the clock signal receiver circuit is referred to as VL and the maximum voltage of the common-mode input voltage range of the clock signal receiver circuit is referred to as VH, the voltage detection circuit detecting whether or not the voltages of the first clock signal line and the second clock signal line have exceeded the maximum voltage VH; and the output mask circuit may mask the output signal from the logic circuit block when the voltages of the first clock signal line and the second clock signal line have exceeded the maximum voltage VH.

When the voltages of the first clock signal line and the second clock signal line are higher than the maximum voltage VH, it may be determined that the clock signals are not transferred through the differential clock signal lines. Since the first clock signal line and the second clock signal line are pulled up by the first pull-up resistor and the second pull-up resistor when the first clock signal line and the second clock signal line are not driven, the high impedance state of the first clock signal line and the second clock signal line can be detected by detecting the pulled-up voltage using the voltage detection circuit.

The high-speed serial interface circuit may further comprise:

a second voltage detection circuit that detects whether or not the voltages of the first clock signal line and the second clock signal have become lower than the minimum voltage VL, and the output mask circuit may mask the output signal from the logic circuit block when the voltages of the first clock signal line and the second clock signal have become lower than the minimum voltage VL.

According to this configuration, the output signal can be masked even if the voltages of the first clock signal line and the second clock signal line are set to be lower than the minimum voltage VL, in addition to the case where the first clock signal line and the second clock signal line are set in a high impedance state. Therefore, malfunction of the circuit in the subsequent stage can be prevented.

In the high-speed serial interface circuit, the high impedance state detection circuit may include:

a first pull-down resistor connected to the first clock signal line;

a second pull-down resistor connected to the second clock signal line; and a voltage detection circuit, when the minimum voltage of a common-mode input voltage range of the clock signal receiver circuit is referred to as VL and the maximum voltage of the common-mode input voltage range of the clock signal receiver circuit is referred to as VH, the voltage detection circuit detecting whether or not the voltages of the first clock signal line and the second clock signal line have become lower than the minimum voltage VL; and the output mask circuit may mask the output signal from the logic circuit block when the voltages of the first clock signal line and the second clock signal line have become lower than the minimum voltage VL.

When the voltages of the first clock signal line and the second clock signal line are lower than the minimum voltage VL, it may be determined that the clock signals are not transferred through the differential clock signal lines. Since the first clock signal line and the second clock signal line are pulled down by the first pull-down resistor and the second pull-down resistor when the first clock signal line and the second clock signal line are not driven, the high impedance state of the first clock signal line and the second clock signal line can be detected by detecting the pulled-down voltage using the voltage detection circuit.

The high-speed serial interface circuit may further comprise:

a second voltage detection circuit that detects whether or not the voltages of the first clock signal line and the second clock signal have exceeded the maximum voltage VH, and the output mask circuit may mask the output signal from the logic circuit block when the voltages of the first clock signal line and the second clock signal have exceeded the maximum voltage VH.

According to this configuration, the output signal can be masked even if the voltages of the first clock signal line and the second clock signal line are set to be higher than the maximum voltage VH, in addition to the case where the first clock signal line and the second clock signal line are set in a high impedance state. Therefore, malfunction of the circuit in the subsequent stage can be prevented.

According to another embodiment of the invention, there is provided an electronic instrument comprising:

one of the above high-speed serial interface circuits; and a device that operates based on data or a clock signal received by the high-speed serial interface circuit.

Preferred embodiments of the invention are described in detail below. Note that the following embodiments do not in any way limit the scope of the invention defined by the claims laid out herein. Note that all elements of the following embodiments should not necessarily be taken as essential requirements for the invention.

1. First Configuration Example

FIG. 1 shows a first configuration example of a high-speed serial interface circuit (data transfer control device or serial interface circuit) according to one embodiment of the invention. The high-speed serial interface circuit includes a data receiver circuit 10, a clock signal receiver circuit 20, a logic circuit block 30, a free-running clock signal generation circuit 70, a clock signal detection circuit 80, and an output mask circuit 90. The high-speed serial interface circuit according to this embodiment is not limited to the configuration shown in FIG. 1. Various modifications may be made such as omitting some of the elements or adding other elements.

The data receiver circuit 10 is a receiver circuit that receives serial data. Specifically, the data receiver circuit 10 receives serial data DP and DM (differential signals (small-amplitude differential signals)) transferred through differential data signal lines (differential signal lines or serial bus in a broad sense), and outputs received serial data DIN. The data receiver circuit 10 includes a differential amplifier OPD (comparator). The differential amplifier OPD differentially amplifies the differential signals DP and DM, and outputs the single-ended (CMOS level) received serial data DIN.

The clock signal receiver circuit 20 is a receiver circuit that receives a clock signal. Specifically, the clock signal receiver circuit 20 receives clock signals CKP and CKM (differential signals (small-amplitude differential signals)) transferred through differential clock signal lines (differential signal lines or serial bus in a broad sense), and outputs a received clock signal CKIN. The clock signal receiver circuit 20 includes a differential amplifier OPC. The differential amplifier OPC differentially amplifies the differential signals CKP and CKM, and outputs the single-ended received clock signal CKIN.

The data receiver circuit 10 and the clock signal receiver circuit 20 need not be dedicated data or clock signal receiver circuits. For example, the data receiver circuit 10 may be used as a clock signal receiver circuit or the clock signal receiver circuit 20 may be used as a data receiver circuit depending on the mounting form of an integrated circuit device including the high-speed serial interface circuit (macroblock).

The logic circuit block 30 (control circuit block or link circuit block) is a circuit block that performs or controls high-speed serial transfer. For example, the logic circuit block 30 may include a serial/parallel conversion circuit 40, a sampling clock signal generation circuit 50, a logic circuit 60, and the like.

The serial/parallel conversion circuit 40 (data sampling circuit) is a circuit that converts the received serial data DIN into parallel data. Specifically, the serial/parallel conversion circuit 40 samples the received serial data DIN from the data receiver circuit 10 based on a sampling clock signal SCK generated using the received clock signal CKIN from the clock signal receiver circuit 20, and converts the received serial data DIN into parallel data. The serial/parallel conversion circuit 40 may be implemented by a flip-flop circuit, the sampling clock signal SCK (multi-phase clock signal) being input to a clock terminal of the flip-flop circuit and the received serial data DIN being input to a data terminal of the flip-flop circuit, for example.

The sampling clock signal generation circuit 50 is a circuit that generates the sampling clock signal SCK. Specifically, the sampling clock signal generation circuit 50 receives the received clock signal CKIN from the clock signal receiver circuit 20, generates the sampling clock signal SCK for sampling the received serial data DIN, and outputs the generated sampling clock signal SCK. The sampling clock signal generation circuit 50 may be implemented by a delayed locked loop (DLL) circuit that generates a multi-phase sampling clock signal, for example.

The logic circuit 60 is a circuit that performs a logic process on the parallel data output from the serial/parallel conversion circuit 40 and the clock signal output from the sampling clock signal generation circuit 50. The logic circuit 60 outputs parallel data RT and a clock signal RCK obtained by the logic process to the circuit in the subsequent stage. Examples of the logic process include a parallel data replacement process, a process that changes mapping of the parallel data on a data channel, a clock signal duty adjustment process, and the like.

The free-running clock signal generation circuit 70 generates a free-running clock signal OSCK (i.e., a clock signal that is not supplied from the outside), and outputs the generated free-running clock signal OSCK. Specifically, the free-running clock signal generation circuit 70 includes a free-running oscillation circuit (e.g., ring oscillator), and generates a free-running oscillation clock signal due to an oscillation operation that starts after power has been supplied. The free-running clock signal generation circuit 70 generates the free-running clock signal OSCK having a desired frequency by dividing the frequency of the oscillation clock signal, if necessary.

The clock signal detection circuit 80 is a circuit that detects whether or not the clock signals are transferred through the differential clock signal lines. Specifically, the clock signal detection circuit 80 compares the received clock signal CKIN from the clock signal receiver circuit 20 with the free-running clock signal OSCK from the free-running clock signal generation circuit 70 to detect whether or not the clock signals are transferred through the differential clock signal lines. When the clock signal detection circuit 80 has determined that the clock signals are transferred through the differential clock signal lines, the clock signal detection circuit 80 activates (e.g., H level) a clock signal detection signal CKDET.

More specifically, the clock signal detection circuit 80 compares the frequency of the received clock signal CKIN with the frequency of the free-running clock signal OSCK. The clock signal detection circuit 80 determines that the clock signals are not transferred through the differential clock signal lines when the frequency of the received clock signal CKIN is lower than the frequency of the free-running clock signal OSCK, and inactivates (e.g., L level) the detection signal CKDET.

The output mask circuit 90 masks the output signals RT (parallel data) and RCK (clock signal) from the logic circuit block 30. Specifically, when the clock signal detection circuit 80 has detected that the clock signals are not transferred through the differential clock signal lines, the output mask circuit 90 masks the output signals RT and RCK from the logic circuit block 30 so that the output signals RT and RCK are not transmitted to the circuit in the subsequent stage.

For example, the output mask circuit 90 includes AND circuits ANB1 and ANB2. The output signals RT and RCK from the logic circuit block 30 are input to first input terminals of the AND circuits ANB1 and ANB2, respectively, and the detection signal CKDET is input to second input terminals of the AND circuits ANB1 and ANB2. Therefore, when the clock signal detection circuit 80 has detected that the clock signals are not transferred through the differential clock signal lines and set the detection signal CKDET at the L level (inactive), output signals RT' and RCK' from the AND circuits ANB1 and ANB2 are fixed at the L level. As a result, the output signals RT and RCK from the logic circuit block 30 are masked and are not transmitted to the circuit in the subsequent stage.

For example, when the CKP and CKM signal lines are fixed at the L level when the clock signals are not transferred, for example, a non-inverting input terminal and an inverting input terminal of the differential amplifier OPC of the clock signal receiver circuit 20 are fixed at the L level. In this case, even if pull-up resistors or the like are connected to the CKP and CKM signal lines as described later, the voltages of the CKP and CKM signal lines are driven toward the L level when a transmitter circuit has high drive capability. When noise is superimposed on the CKP and CKM signal lines in a state in which the CKP and CKM signal lines are fixed at the L level, the noise is amplified by the differential amplifier OPC and behaves in the same manner as a clock signal, whereby the high-speed serial interface circuit and the circuit in the subsequent stage malfunction.

On the other hand, when small-amplitude differential clock signals are not transferred through the CKP and CKM signal lines (i.e., the clock signals are not transferred), it is not desirable (unnecessary) to output the output signals RT and RCK from the high-speed serial interface circuit to the circuit in the subsequent stage.

In this embodiment, the output signals RT and RCK from the logic circuit block 30 are masked by the output mask circuit 90 when the clock signals are not transferred through the CKP and CKM signal lines. Therefore, even if noise superimposed on the CKP and CKM signal lines is amplified by the differential amplifier OPC and behaves in the same manner as a clock signal so that the high-speed serial interface circuit has performed an unexpected operation, the unstable output signals RT and RCK are not transmitted to the circuit in the subsequent stage. Specifically, the output signals RT and RCK are transmitted to the circuit in the subsequent stage only when the small-amplitude differential clock signals are transferred through the CKP and CKM signal lines. This effectively prevents malfunction due to noise superimposed on the CKP and CKM signal lines, for example.

In this embodiment, the clock signal detection circuit 80 detects whether or not the clock signals are transferred through the CKP and CKM signal lines by comparing the received clock signal CKIN with the free-running clock signal OSCK. Specifically, the clock signal detection circuit 80 compares the frequency of the received clock signal CKIN with the frequency of the free-running clock signal OSCK.

For example, whether or not the clock signals are transferred through the CKP and CKM signal lines may be detected by extracting the envelope of the clock signal or the like. However, since this method requires an analog circuit having a complicated circuit configuration, an increase in circuit scale, power consumption, and the degree of complexity of the circuit design occurs.

According to the method that compares the received clock signal CKIN with the free-running clock signal OSCK employed in this embodiment, whether or not the clock signals are transferred through the CKP and CKM signal lines can be detected using a circuit having a simple configuration as compared with the method that extracts the envelope of the clock signal. Therefore, a reduction in circuit scale and power consumption can be implemented.

Figure 2:
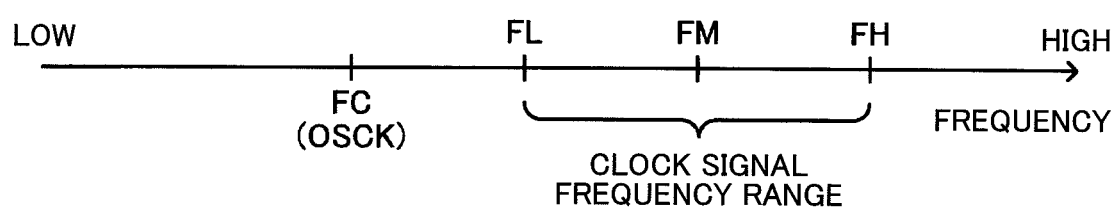
FIG. 2 is a view illustrative of the relationship between a clock signal frequency range and a free-running clock signal frequency.

In FIG. 2, FL indicates the minimum frequency of the frequency range of the clock signals transferred through the differential clock signal lines, and FH indicates the maximum frequency of the clock signal frequency range, for example. Specifically, the frequency of the clock signals transferred through the differential clock signal lines is generally specified by a standard or the like. For example, FL indicates the minimum frequency (e.g., 20 MHz) in a low-speed mode, and FH indicates the maximum frequency (e.g., 135 MHz) in a high-speed mode. Therefore, when the clock signals are appropriately transferred through the differential clock signal lines, the frequency range of the clock signals is in the range between the frequency FL and the frequency FH. In other words, when a signal having a frequency outside the frequency range between the frequency FL and the frequency FH has been detected in the CKIN signal line, the signal is considered to be amplified noise.

In this embodiment, when the minimum frequency of the frequency range of the clock signals transferred through the CKP and CKM signal lines is FL, the free-running clock signal generation circuit 70 generates the free-running clock signal OSCK having a frequency FC that satisfies the relationship FC<FL, and supplies the free-running clock signal OSCK to the data receiver circuit 10 and the clock signal receiver circuit 20, as shown in FIG. 2.

However, an integrated circuit device including the high-speed serial interface circuit is normally operated based on a system clock signal generated based on the clock signals CKP and CKM received through the differential clock signal lines. Therefore, the free-running clock signal generation circuit 70 shown in FIG. 1 is not generally provided.

In this embodiment, the free-running clock signal generation circuit 70 which is generally unnecessary is provided for clock signal detection and the like. The frequency FC of the free-running clock signal OSCK output from the free-running clock signal generation circuit 70 is set to satisfy the relationship FC<FL, as shown in FIG. 2, and the frequency of the free-running clock signal OSCK is compared with the frequency of the received clock signal CKIN. When the frequency of the received clock signal CKIN is lower than the frequency of the free-running clock signal OSCK, the clock signal detection circuit 80 determines that the clock signals are not transferred through the differential clock signal lines.

According to this configuration, when a signal having a frequency outside the frequency range between the frequency FL and the frequency FH of the clock signals transferred through the CKP and CKM signal lines has been detected in the CKIN signal line, the clock signal detection circuit 80 determines that the signal is amplified noise which behaves in the same manner as a clock signal, and determines that the clock signals are not transferred through the CKP and CKM signal lines. Even if the high-speed serial interface circuit malfunctions due to such a signal, since the output signals RT and RCK are masked by the output mask circuit 90, a situation in which the circuit in the subsequent stage is adversely affected by malfunction can be effectively prevented.

2. Second Configuration Example

Figure 3:
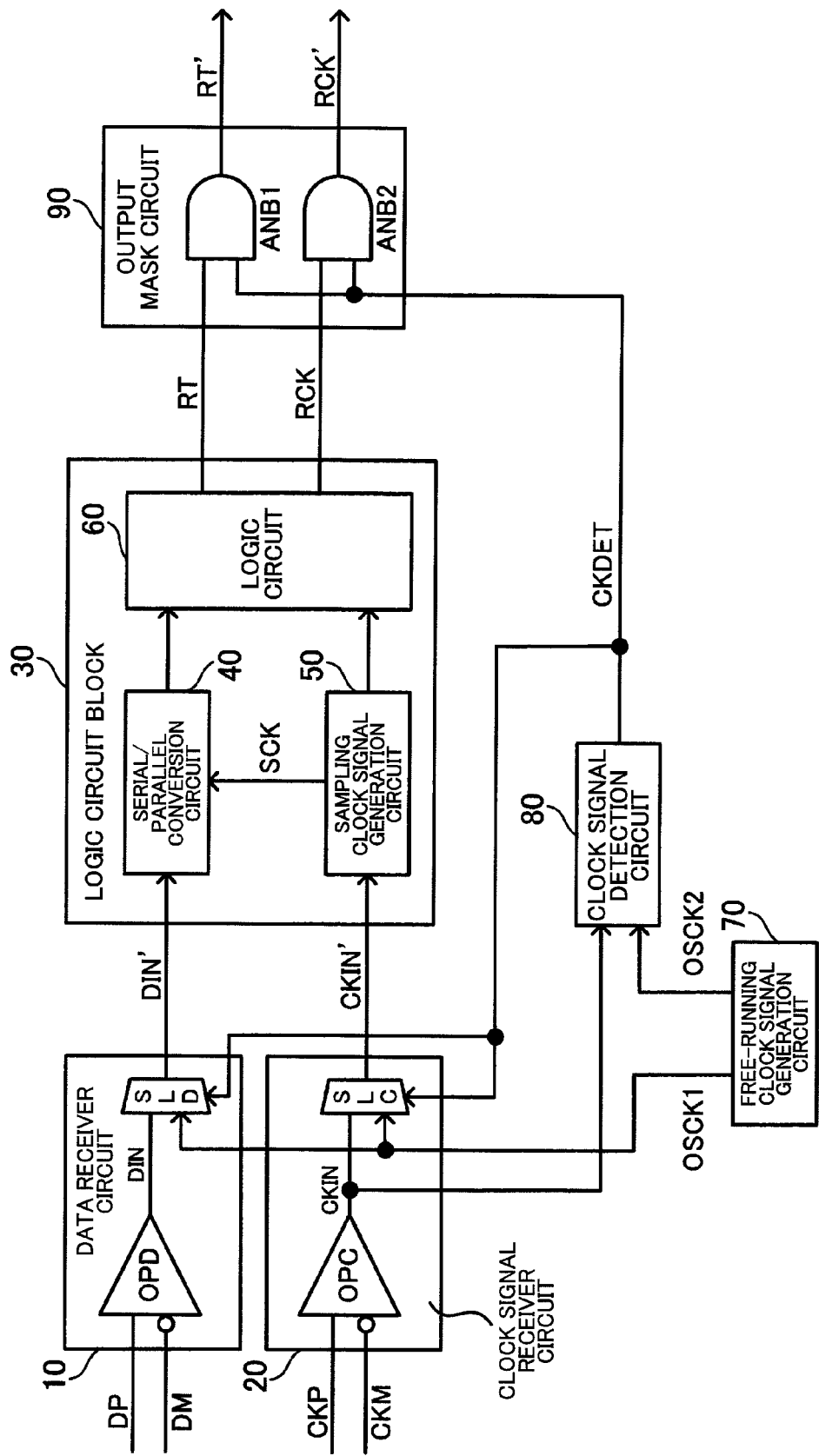
FIG. 3 shows a second configuration example of a high-speed serial interface circuit according to one embodiment of the invention.

FIG. 3 shows a second configuration example according to this embodiment. The second configuration example reduces a temporal variation in a transistor.

For example, a negative bias temperature instability (NBTI) phenomenon is known as a temporal variation in a P-type transistor. The NBTI phenomenon refers to a phenomenon in which the absolute value of the threshold voltage of a P-type transistor gradually increases when the potential of the gate electrode is negative with respect to the potential of a substrate of the transistor. The NBTI phenomenon is aggravated as the temperature of an integrated circuit device increases. A characteristic variation phenomenon due to hot carriers is known as a temporal variation in an N-type transistor. Specifically, electrons that flow from the source to the drain are accelerated by a strong electric field. Electrons provided with high energy generate electron-hole pairs due to impact ionization and enter a gate oxide film, thereby causing a change in threshold voltage of the transistor, resulting in oxide breakdown. A characteristic variation and deterioration due to hot carriers can be avoided to some extent by utilizing a light doped drain (LDD) structure for the transistor.

For example, when the CKP and CKM signal lines or the DP and DM signal lines are fixed at the L level or the H level after a macroblock enable signal of the high-speed serial interface circuit has been activated, and the high-speed serial interface circuit is allowed to stand at a high temperature for a long time, the threshold voltage of the P-type transistor of the high-speed serial interface circuit is shifted. Specifically, when a negative bias is applied to the transistor forming the circuit of the logic circuit block 30 at high temperature for a long time, the threshold voltage of the P-type transistor is shifted. Therefore, the balance between the P-type transistor and the N-type transistor relating to the drive capability is lost, whereby the circuit characteristics or the delay time of the logic circuit changes. As a result, even if the sampling point of the sampling clock signal SCK is set near the center of the data before shipment, the sampling point is shifted from the center due to the NBTI phenomenon, for example.

In this case, the sampling point or the delay time may be set taking into account a change in threshold voltage or delay time due to the NBTI phenomenon. However, this method reduces the design margin since a change in threshold voltage or delay time due to the NBTI phenomenon must be taken into account.

In order to solve such a problem, the second configuration example shown in FIG. 3 focuses on the presence of the free-running clock signal generation circuit 70, and employs a method that inputs the free-running clock signal to the circuit in the subsequent stage when the clock signals and data are not transferred through the differential signal lines.

In the second configuration example shown in FIG. 3, the clock signal receiver circuit 20 receives a free-running clock signal OSCK1 from the free-running clock signal generation circuit 70. When the clock signal detection circuit 80 has detected that the clock signals CKP and CKM are not transferred through the differential clock signal lines, the clock signal receiver circuit 20 outputs the free-running clock signal OSCK1 to the logic circuit block 30 (sampling clock signal generation circuit) in the subsequent stage as a clock signal CKIN' instead of the received clock signal CKIN.

The data receiver circuit 10 receives the free-running clock signal OSCK1 from the free-running clock signal generation circuit 70. When the clock signal detection circuit 80 has detected that the clock signals are not transferred through the differential clock signal lines, the data receiver circuit 10 outputs the free-running clock signal OSCK1 to the logic circuit block 30 (serial/parallel conversion circuit) in the subsequent stage as a data DIN' instead of the received serial data DIN. Note that a modification may be made in which only the clock signal receiver circuit 20 is provided with the NBTI prevention free-running clock signal output function.

The clock signal detection circuit 80 receives a free-running clock signal OSCK2 from the free-running clock signal generation circuit 70, and compares the received clock signal CKIN with the free-running clock signal OSCK2. When the clock signal detection circuit 80 has detected that the clock signals are transferred through the CKP and CKM clock signal lines, the clock signal detection circuit 80 activates the detection signal CKDET. When the clock signal detection circuit 80 has detected that the clock signals are not transferred through the CKP and CKM clock signal lines, the clock signal detection circuit 80 inactivates the detection signal CKDET.

When the clock signal detection circuit 80 has detected that the clock signals are transferred through the differential clock signal lines and activated the detection signal CKDET, the clock signal receiver circuit 20 outputs the received clock signal CKIN corresponding to the clock signals CKP and CKM to the logic circuit block 30. When the clock signal detection circuit 80 has detected that the clock signals are not transferred through the differential clock signal lines and inactivated the detection signal CKDET, the clock signal receiver circuit 20 outputs the free-running clock signal OSCK1 from the free-running clock signal generation circuit 70 to the logic circuit block 30 as the clock signal CKIN' instead of the received clock signal CKIN.

Likewise, when the clock signal detection circuit 80 has detected that the clock signals are transferred through the differential clock signal lines and activated the detection signal CKDET, the data receiver circuit 10 outputs the received serial data DIN corresponding to the data DP and DM to the logic circuit block 30. When the clock signal detection circuit 80 has detected that the clock signals are not transferred through the differential clock signal lines and inactivated the detection signal CKDET, the data receiver circuit 10 outputs the free-running clock signal OSCK1 to the logic circuit block 30 as the data DIN' instead of the received serial data DIN.

More specifically, the clock signal receiver circuit 20 includes a clock signal selector SLC. The received clock signal CKIN is input to a first input terminal of the clock signal selector SLC, and the free-running clock signal OSCK1 is input to a second input terminal of the clock signal selector SLC. The clock signal selector SLC selectively outputs the received clock signal CKIN or the free-running clock signal OSCK1 based on the detection signal CKDET from the clock signal detection circuit 80. Specifically, when the detection signal CKDET is active (H level), the clock signal selector SLC selects the received clock signal CKIN and outputs the received clock signal CKIN as the clock signal CKIN'. When the detection signal CKDET is inactive (L level), the clock signal selector SLC selects the free-running clock signal OSCK1 and outputs the free-running clock signal OSCK1 as the clock signal CKIN'. When the detection signal CKDET is inactive, the output signals RT and RCK from the logic circuit block 30 are masked by the output mask circuit 90 and are not output to the circuit in the subsequent stage.

The data receiver circuit 10 includes a data selector SLD. The received serial data DIN is input to a first input terminal of the data selector SLD, and the free-running clock signal OSCK1 is input to a second input terminal of the data selector SLD. The data selector SLD selectively outputs the received serial data DIN or the free-running clock signal OSCK1 based on the detection signal CKDET from the clock signal detection circuit 80. Specifically, when the detection signal CKDET is active, the data selector SLD selects the received serial data DIN and outputs the received serial data DIN as the data DIN'. When the detection signal CKDET is inactive, the data selector SLD selects the free-running clock signal OSCK1 and outputs the free-running clock signal OSCK1 to the logic circuit block 30 as the data DIN'.

According to the second configuration example shown in FIG. 3, when transfer of the clock signals through the differential clock signal lines has been stopped and the clock signal detection circuit 80 has detected that the clock signals CKP and CKM are not transferred through the differential clock signal lines, the free-running clock signal OSCK1 from the free-running clock signal generation circuit 70 is input to the logic circuit block 30 instead of the received clock signal CKIN and the received serial data DIN. Therefore, even if the clock signals CKP and CKM and the data DP and DM are not transferred for a long time after the enable signal of the high-speed serial interface circuit has been activated, the free-running clock signal OSCK1 is supplied to the logic circuit block 30 as a pseudo clock signal and pseudo data. In this case, since the output signals RT and RCK are masked by the output mask circuit 90 when the detection signal CKDET has been inactivated, a situation in which an inappropriate output signal is transmitted to the circuit in the subsequent stage is prevented. Therefore, the configuration shown in FIG. 3 suppresses a situation in which the threshold value of the transistor of the logic circuit block 30 is shifted due to the NBTI phenomenon, for example, so that reliability and the design margin can be improved.

In particular, the configuration shown in FIG. 3 is characterized in that the NBTI phenomenon is reduced by effectively utilizing the free-running clock signal generation circuit 70 and the clock signal detection circuit 80 provided for masking the output signals. In FIG. 3, the clock signal detection circuit 80 detects that the clock signals CKP and CKM are not transferred through the differential clock signal lines by utilizing the free-running clock signal OSCK2 from the free-running clock signal generation circuit 70 to mask the output signals RT and RCK, and the NBTI phenomenon is reduced by supplying the free-running clock signal OSCK1 to the logic circuit block 30 through the selectors SLC and SLD when the clock signal detection circuit 80 has detected that the clock signals CKP and CKM are not transferred through the differential clock signal lines. Accordingly, it is possible to mask the output signals while reducing the NBTI phenomenon by a small-scale, simple circuit configuration.

Note that the frequencies of the free-running clock signals OSCK1 and OSCK2 output from the free-running clock signal generation circuit 70 may be set to be the same or different. When the frequencies of the free-running clock signals OSCK1 and OSCK2 are set to be different, it is desirable to set the frequency FC1 of the free-running clock signal OSCK1 and the frequency FC2 of the free-running clock signal OSCK2 to satisfy the relationship FC2<FC1.

3. Third Configuration Example

Figure 4:
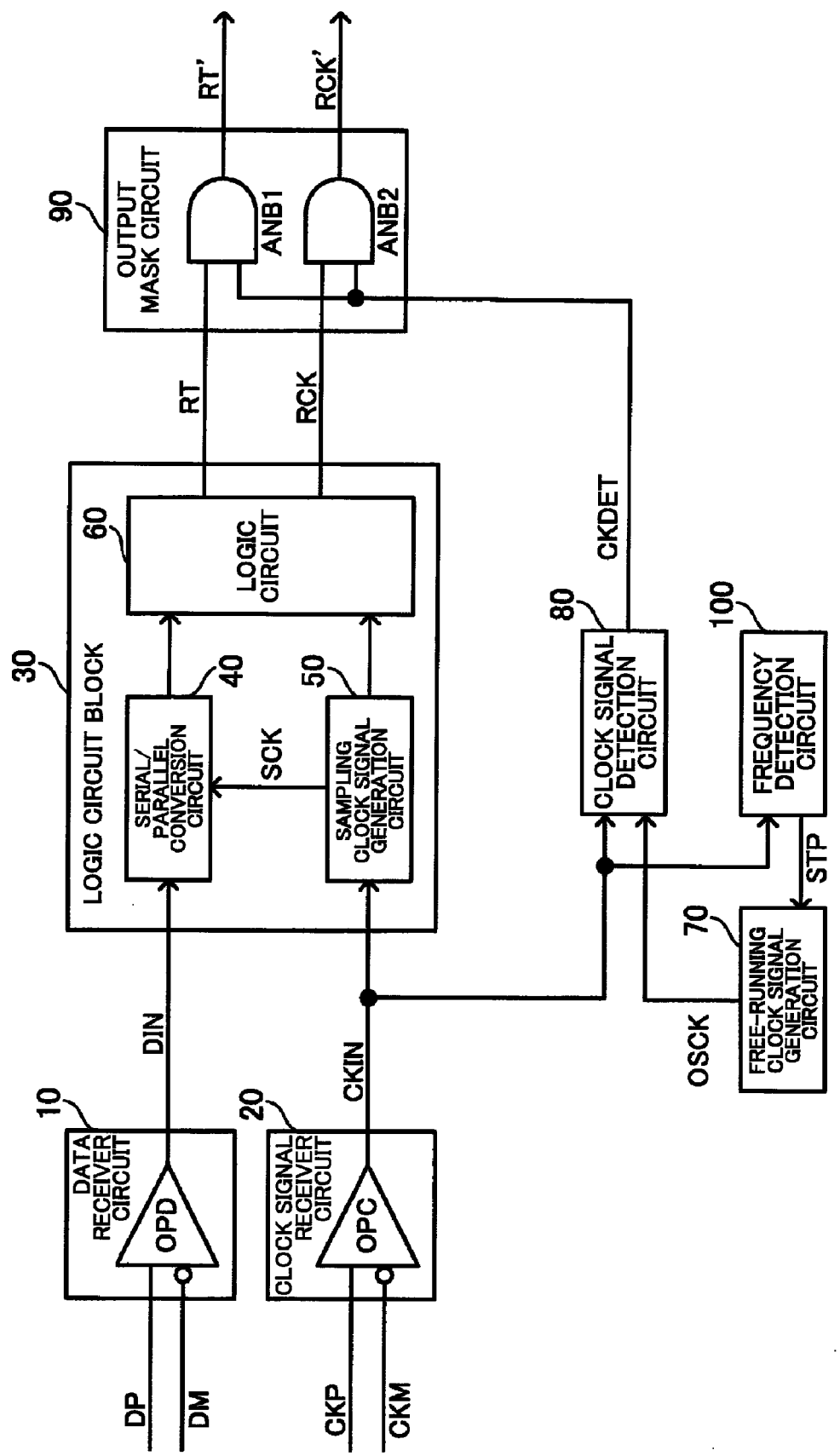
FIG. 4 shows a third configuration example of a high-speed serial interface circuit according to one embodiment of the invention.

FIG. 4 shows a third configuration example according to this embodiment. In FIG. 4, a frequency detection circuit 100 is provided in addition to the configuration shown in FIG. 1. Note that a modification may be made in which the configuration shown in FIG. 3 or the like is combined with the configuration shown in FIG. 4.

The frequency detection circuit 100 detects the frequency of the received clock signal CKIN. When the frequency of the received clock signal CKIN has exceeded a frequency FM, the frequency detection circuit 100 activates an operation stop signal STP supplied to the free-running clock signal generation circuit 70. This causes the oscillation circuit included in the free-running clock signal generation circuit 70 to stop the oscillation operation so that the free-running clock signal generation circuit 70 stops generating the free-running clock signal OSCK.

As shown in FIG. 2, the frequency FM that causes the free-running clock signal generation circuit 70 to stop generating the free-running clock signal is a frequency in the frequency range between the frequency FL and the frequency FH of the clock signals CKP and CKM.

For example, when the frequencies of the clock signals CKP and CKM are low (e.g., the frequency FL shown in FIG. 2), even if the oscillation circuit of the free-running clock signal generation circuit 70 performs the oscillation operation, noise of the oscillation clock signal adversely affects data transfer and clock signal transfer through the differential signal lines to only a small extent.

On the other hand, when the frequencies of the clock signals CKP and CKM are high (e.g., the frequency FH shown in FIG. 2), noise of the oscillation clock signal generated by the free-running clock signal generation circuit 70 may adversely affect data transfer and clock signal transfer through the differential signal lines. When the data and the clock signal are transferred normally, it is unnecessary to mask the output signals or generate the free-running clock signal OSCK for reducing the NBTI phenomenon.

In FIG. 4, the frequency detection circuit 100 detects the frequency of the received clock signal CKIN, and activates the operation stop signal STP when the frequency of the received clock signal CKIN is higher than the frequency FM (FL<FM<FH) so that the free-running clock signal generation circuit 70 stops operation. This prevents a situation in which the oscillation clock signal generated by the free-running clock signal generation circuit 70 adversely affects data transfer and clock signal transfer through the differential signal lines.

Figure 5:
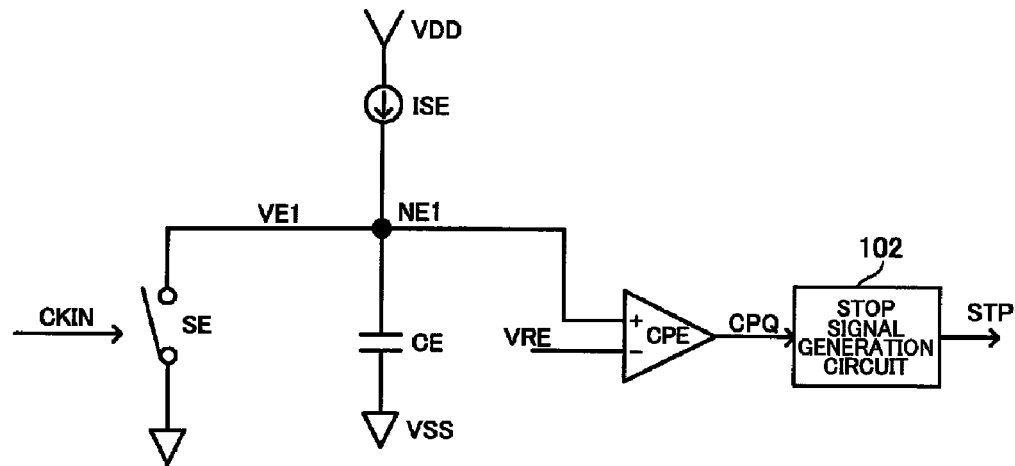
FIG. 5 shows a configuration example of a frequency detection circuit.

FIG. 5 shows a configuration example of the frequency detection circuit 100. The frequency detection circuit 100 includes a switching element SE (switching transistor), a capacitor CE, a current source ISE (current source transistor), a comparator CPE, and a stop signal generation circuit 102.

The switching element SE and the capacitor CE are provided between a node NE1 and a power supply VSS (first power supply). The current source ISE is provided between a power supply VDD (second power supply) and the node NE1. The comparator CPE compares a voltage VE1 of the node NE1 with a reference voltage VRE. The stop signal generation circuit 102 generates the operation stop signal STP based on an output signal CPQ from the comparator CPE, and outputs the generated operation stop signal STP.

In FIG. 5, the capacitor CE is charged by a constant current from the current source ISE, and the voltage VE1 of the node NE1 increases by a time constant determined by the constant current value of the current source ISE and the capacitance of the capacitor CE. Since the discharge time interval of the node NE1 through the switching element SE increases when the frequency of the received clock signal CKIN is low, the voltage VE1 exceeds the reference voltage VRE so that the pulsed output signal CPQ is output from the comparator CPE. Since the discharge time interval of the node NE1 through the switching element SE decreases when the frequency of the received clock signal CKIN increases, the pulsed output signal CPQ is not output from the comparator CPE. The stop signal generation circuit 102 determines whether or not the frequency of the received clock signal CKIN has exceeded the frequency FM based on the output signal CPQ. The stop signal generation circuit 102 activates the operation stop signal STP when the frequency of the received clock signal CKIN has exceeded the frequency FM so that the free-running clock signal generation circuit 70 stops operation.

4. Free-running Clock Signal Generation Circuit and Clock Signal Detection Circuit The details of the free-running clock signal generation circuit 70 and the clock signal detection circuit 80 are described below.

Figure 6:
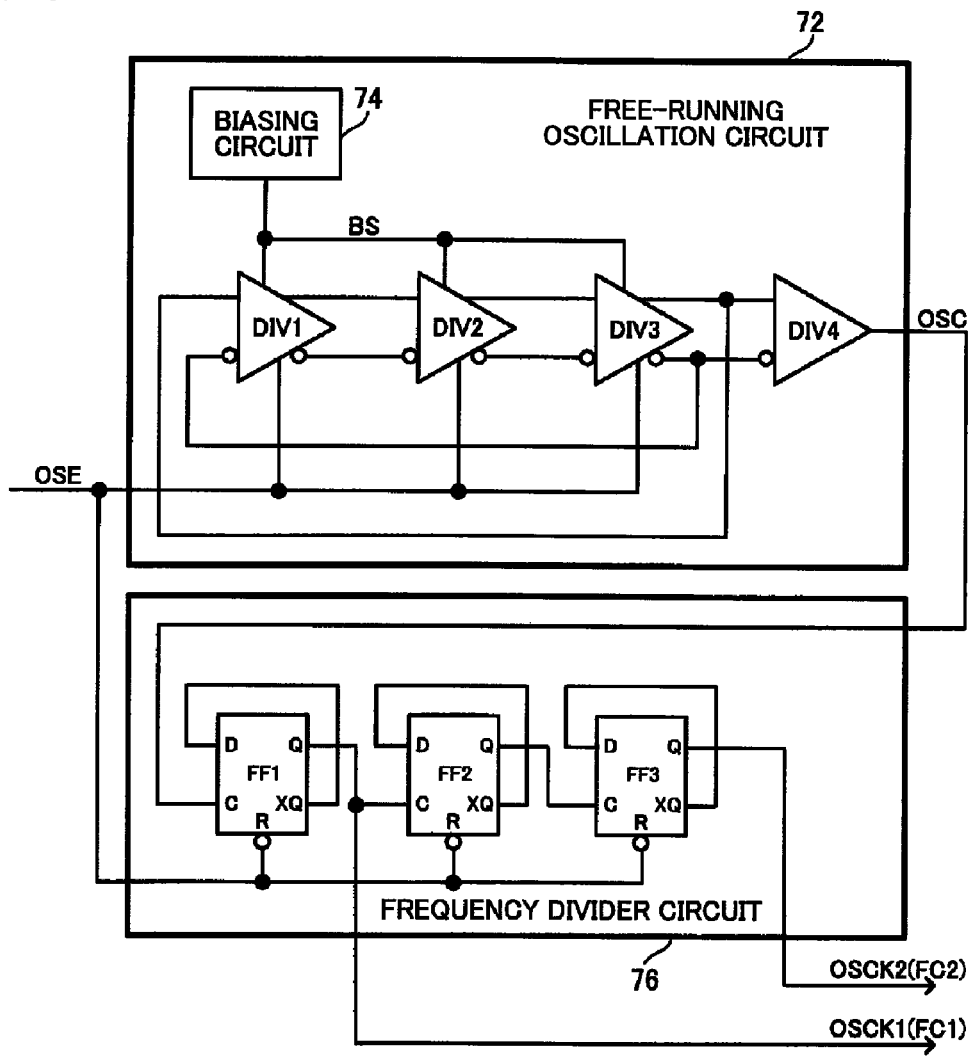
FIG. 6 shows a configuration example of a free-running signal generation circuit.

FIG. 6 shows a configuration example of the free-running clock signal generation circuit 70. Note that the free-running clock signal generation circuit 70 according to this embodiment is not limited to the configuration shown in FIG. 6. Various modifications may be made such as omitting some elements (e.g., frequency divider circuit) or adding other elements.

The free-running clock signal generation circuit 70 shown in FIG. 6 includes a free-running oscillation circuit 72 and a frequency divider circuit 76. The free-running oscillation circuit 72 generates a free-running oscillation clock signal OSC by the oscillation operation of a ring oscillator. The frequency divider circuit 76 divides the frequency of the oscillation clock signal OSC to generate the first free-running clock signal OSCK1, and outputs the first free-running clock signal OSCK1 to the clock signal receiver circuit 20 and the data receiver circuit 10, as shown in FIG. 3. The frequency divider circuit 76 divides the frequency of the oscillation clock signal OSC to generate the second free-running clock signal OSCK2, and outputs the second free-running clock signal OSCK2 to the clock signal detection circuit 80.

The free-running oscillation circuit 72 includes a plurality of cascaded differential inverting buffers DIV1, DIV2, and DIV3, and an inverting buffer DIV4 that functions as a buffer circuit for the oscillation clock signal OSC. The output from the inverting buffer DIV3 is fed back to the input of the first-stage inverting buffer DIV1, whereby a ring oscillator is formed. A current that flows through the inverting buffers DIV1, DIV2, and DIV3 is controlled by a bias voltage BS from a biasing circuit 74 so that the oscillation frequency is adjusted. Although the differential inverting buffers DIV1 to DIV3 are used in FIG. 6, a single-ended inverting buffer may also be used.

The frequency divider circuit 76 includes flip-flop circuits FF1, FF2, and FF3. The free-running clock signal OSCK1 obtained by dividing the frequency of the oscillation clock signal OSC by two is output from an output terminal of the flip-flop circuit FF1. The free-running clock signal OSCK2 obtained by dividing the frequency of the oscillation clock signal OSC by eight is output from an output terminal of the flip-flop circuit FF3. Therefore, when the frequencies of the free-running clock signals OSCK1 and OSCK2 are respectively referred to as FC1 and FC2, the relationship FC2<FC1 is satisfied.

Figure 7A:
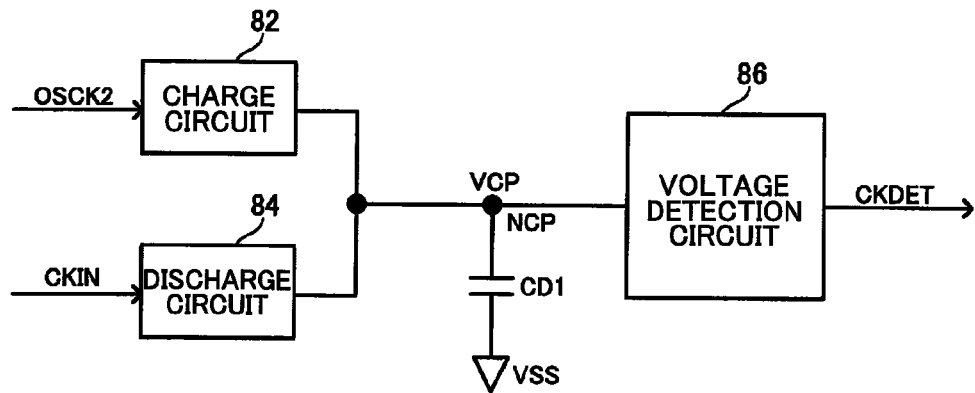
FIGS. 7A and 7B show a configuration example of a clock signal detection circuit.

FIG. 7A shows a configuration example of the clock signal detection circuit 80. The clock signal detection circuit 80 includes a charge circuit 82, a discharge circuit 84, and a voltage detection circuit 86.

The charge circuit 82 charges a charge-pump node NCP connected to a first capacitor CD1 by a time constant corresponding to the frequency of the free-running clock signal OSCK2 (OSCK). For example, the charge circuit 82 charges the charge-pump node NCP by a fast time constant when the frequency of the free-running clock signal OSCK2 is high, and charges the charge-pump node NCP by a slow time constant when the frequency of the free-running clock signal OSCK2 is low.

The discharge circuit 84 discharges the charge-pump node NCP by a time constant corresponding to the frequency of the received clock signal CKIN. For example, the discharge circuit 84 discharges the charge-pump node NCP by a fast time constant when the frequency of the received clock signal CKIN is high, and discharges the charge-pump node NCP by a slow time constant when the frequency of the received clock signal CKIN is low.

The voltage detection circuit 86 detects a voltage VCP of the charge-pump node NCP, and outputs the detection signal CKDET. The voltage detection circuit 86 may be implemented by a Schmidt trigger circuit, for example.

Figure 7B:
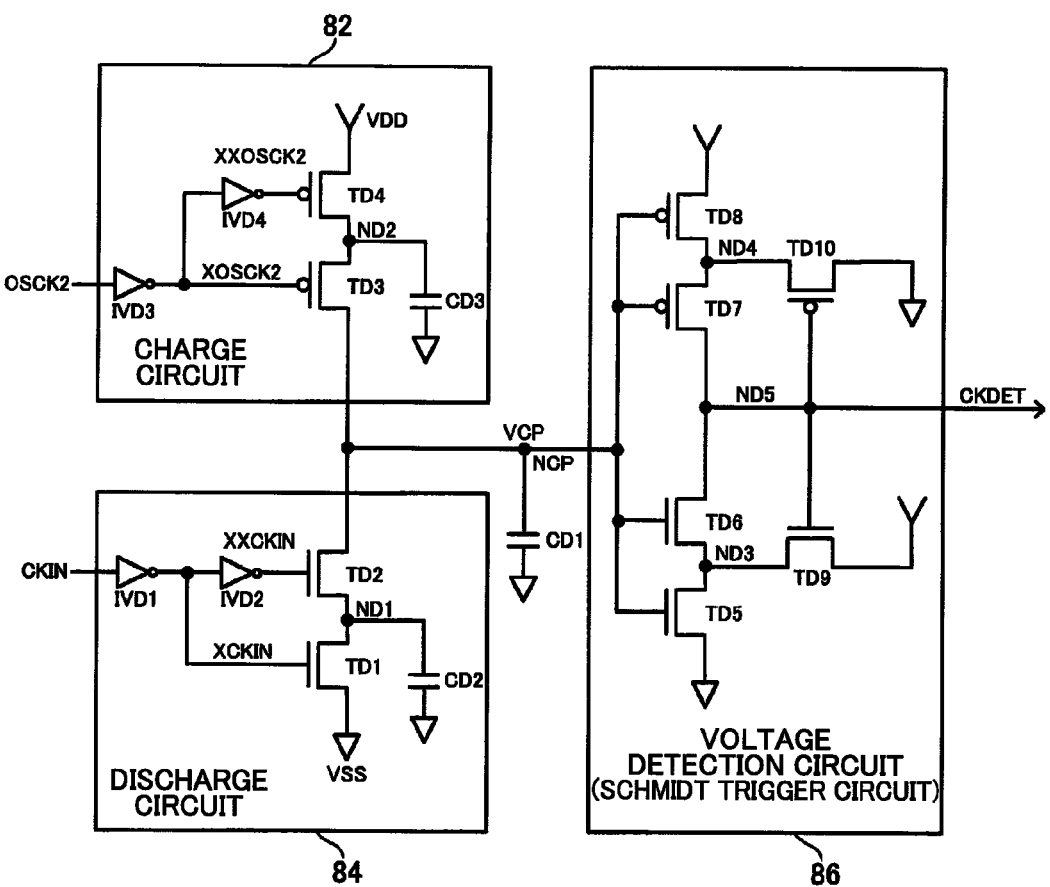

FIG. 7B shows detailed configuration examples of the charge circuit 82, the discharge circuit 84, and the voltage detection circuit 86. As shown in FIG. 7B, the discharge circuit 84 includes N-type (first conductivity type in a broad sense) first and second transistors TD1 and TD2. The charge circuit 82 includes P-type (second conductivity type in a broad sense) third and fourth transistors TD3 and TD4.

The N-type transistor TD1 included in the discharge circuit 84 is provided between a first intermediate node ND1 connected to a second capacitor CD2 and the power supply VSS (first power supply in a broad sense). The N-type transistor TD1 is turned ON when the received clock signal CKIN is set at the L level (first voltage level in a broad sense). Specifically, an inverted signal XCKIN of the received clock signal CKIN is input to the gate of the transistor TD1.

The N-type transistor TD2 included in the discharge circuit 84 is provided between the charge-pump node NCP and the intermediate node ND1. The N-type transistor TD2 is turned ON when the received clock signal CKIN is set at the H level (second voltage level in a broad sense). Specifically, a non-inverted signal XXCKIN of the received clock signal CKIN is input to the gate of the transistor TD2.

The P-type transistor TD3 included in the charge circuit 82 is provided between a second intermediate node ND2 connected to a third capacitor CD3 and the charge-pump node NCP. The P-type transistor TD3 is turned ON when the free-running clock signal OSCK2 is set at the H level (second voltage level in a broad sense). Specifically, an inverted signal XOSCK2 of the free-running clock signal OSCK2 is input to the gate of the transistor TD3.

The P-type transistor TD4 included in the charge circuit 82 is provided between the power supply VDD (second power supply) and the intermediate node ND2. The P-type transistor TD4 is turned ON when the free-running clock signal OSCK2 is set at the L level (first voltage level in a broad sense). Specifically, a non-inverted signal XXOSCK2 of the free-running clock signal OSCK2 is input to the gate of the transistor TD4.

The voltage detection circuit 86 is formed using a Schmidt trigger circuit. Specifically, the voltage VCP of the charge-pump node NCP is input to the gate of the voltage detection circuit 86. The voltage detection circuit 86 includes P-type transistors TD8 and TD7 and N-type transistors TD6 and TD5 connected in series between the power supply VDD and the power supply VSS.

The voltage detection circuit 86 also includes transistors TD9 and TD10. The transistor TD9 is provided between an intermediate node ND3 of the transistors TD6 and TD5 and the power supply VDD. An output node ND5 of the detection signal CKDET is connected to the gate of the transistor TD9.

The transistor TD10 is provided between an intermediate node ND4 of the transistors TD8 and TD7 and the power supply VSS. The output node ND5 is connected to the gate of the transistor TD10.

Figure 8:
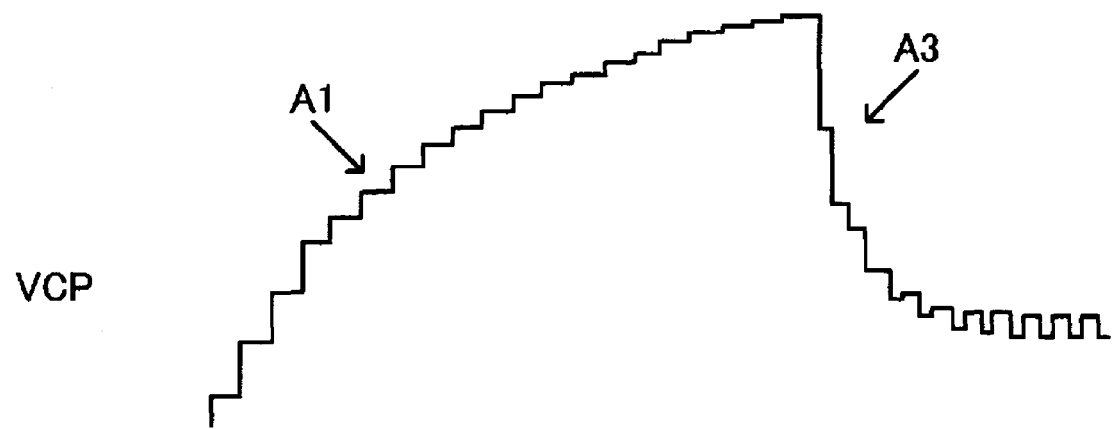
FIG. 8 shows a signal waveform example illustrative of the operation of a clock signal detection circuit.
Figure 8:
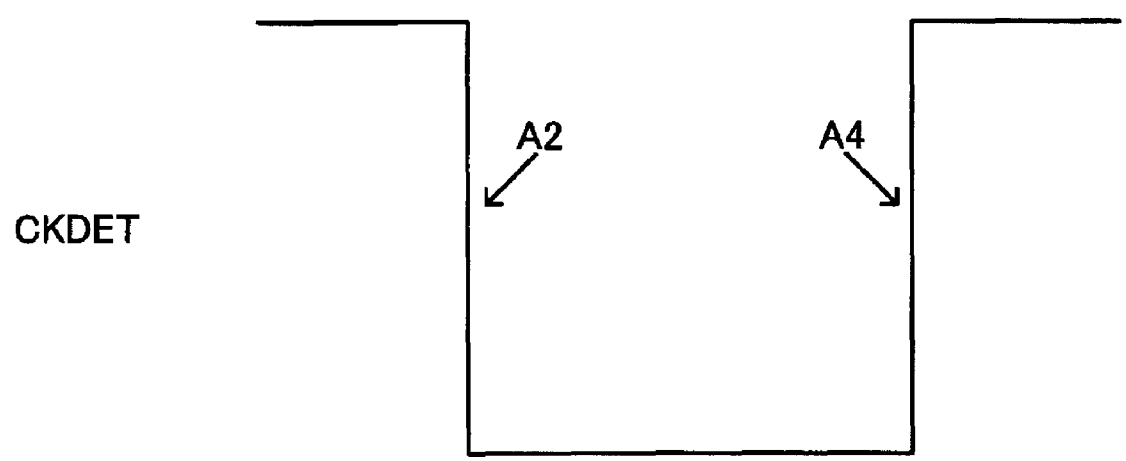

FIG. 8 shows a signal waveform example illustrative of the operation of the clock signal detection circuit 80 shown in FIGS. 7A and 7B. When the enable signal of the high-speed serial interface circuit has been activated so that the operation of the clock signal detection circuit 80 has been enabled, the charge circuit 82 starts the charging operation so that the voltage VCP of the node NCP increases due to charging, as indicated by A1 in FIG. 8. In this case, the charging time constant is determined by the frequency of the free-running clock signal OSCK2. The voltage VCP increases at a higher rate as the frequency of the free-running clock signal OSCK2 increases. When the voltage VCP has exceeded a first threshold voltage VTH1 of the voltage detection circuit 86 (Schmidt trigger circuit), the detection signal CKDET is set at the L level (inactive), as indicated by A2.

The discharge circuit 84 starts the discharge operation when the received clock signal CKIN has been input. In this case, the discharging time constant is determined by the frequency of the received clock signal CKIN.

When the frequency of the clock signal CKIN is sufficiently higher than the frequency of the free-running clock signal OSCK2 (OSCK), the amount of discharging by the discharge circuit 84 is larger than the amount of charging by the charge circuit 82. Therefore, the voltage VCP of the node NCP decreases, as indicated by A3 in FIG. 8. When the voltage VCP has become lower than a second threshold voltage VTH2 (VTH2<VTH1) of the voltage detection circuit 86 (Schmidt trigger circuit), the detection signal CKDET is set at the H level (active), as indicated by A4.

Since the voltage detection circuit 86 is formed using a Schmidt trigger circuit and has the first and second threshold voltages VTH1 and VTH2, a glitch in the detection signal CKDET due to noise or the like does not occur. Therefore, malfunction can be prevented.

Figure 9:
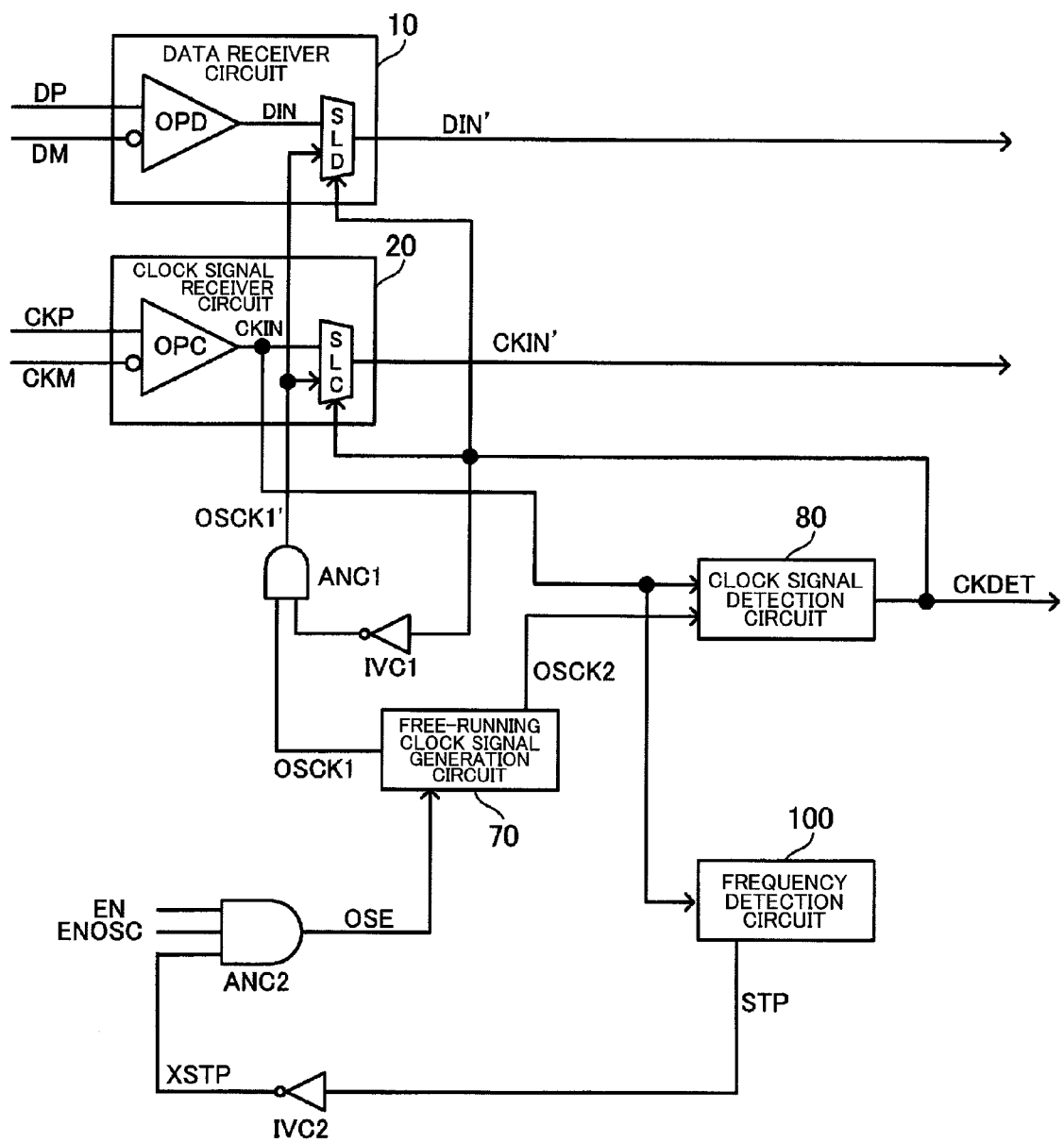
FIG. 9 shows a detailed connection configuration example of a free-running clock signal generation circuit, a clock signal detection circuit, and a frequency detection circuit.

FIG. 9 shows a detailed connection configuration example of the free-running clock signal generation circuit 70, the clock signal detection circuit 80, and the frequency detection circuit 100.

An enable signal EN of the high-speed serial interface circuit, an oscillation enable signal ENOSC, and an inverted signal XSTP of the operation stop signal STP are input to an AND circuit ANC2. When the signals EN, ENOSC, and XSTP are set at the H level, an enable signal OSE of the free-running clock signal generation circuit 70 is set at the H level. This causes the free-running clock signal generation circuit 70 to start the free-running oscillation operation and output the free-running clock signals OSCK1 and OSCK2.

The clock signal detection circuit 80 compares the free-running clock signal OSCK2 with the received clock signal CKIN. When the clock signal detection circuit 80 has detected that the clock signals CKP and CKM are not transferred through the differential clock signal lines, the clock signal detection circuit 80 sets the detection signal CKDET at the L level. Therefore, the free-running clock signal OSCK1 from the free-running clock signal generation circuit 70 is supplied to the selectors SLC and SLD of the clock signal receiver circuit 20 and the data receiver circuit 10 through an AND circuit ANC1, and then input to the logic circuit block 30.

When the clock signal detection circuit 80 has detected that the clock signals CKP and CKM are transferred through the differential clock signal lines, the clock signal detection circuit 80 sets the detection signal CKDET at the H level. Therefore, the free-running clock signal OSCK1 from the free-running clock signal generation circuit 70 is masked by the AND circuit ANC1, and the received clock signal CKIN and the received serial data DIN from the differential amplifiers OPC and OPD are supplied to the logic circuit block 30.

When the frequency of the received clock signal CKIN has increased and exceeded the frequency FM, the frequency detection circuit 100 detects that the frequency FM has been exceeded and sets the operation stop signal STP at the H level. This causes the enable signal OSE output from the AND circuit ANC2 to be set at the L level so that the free-running clock signal generation circuit 70 stops the oscillation operation.

Figure 10:
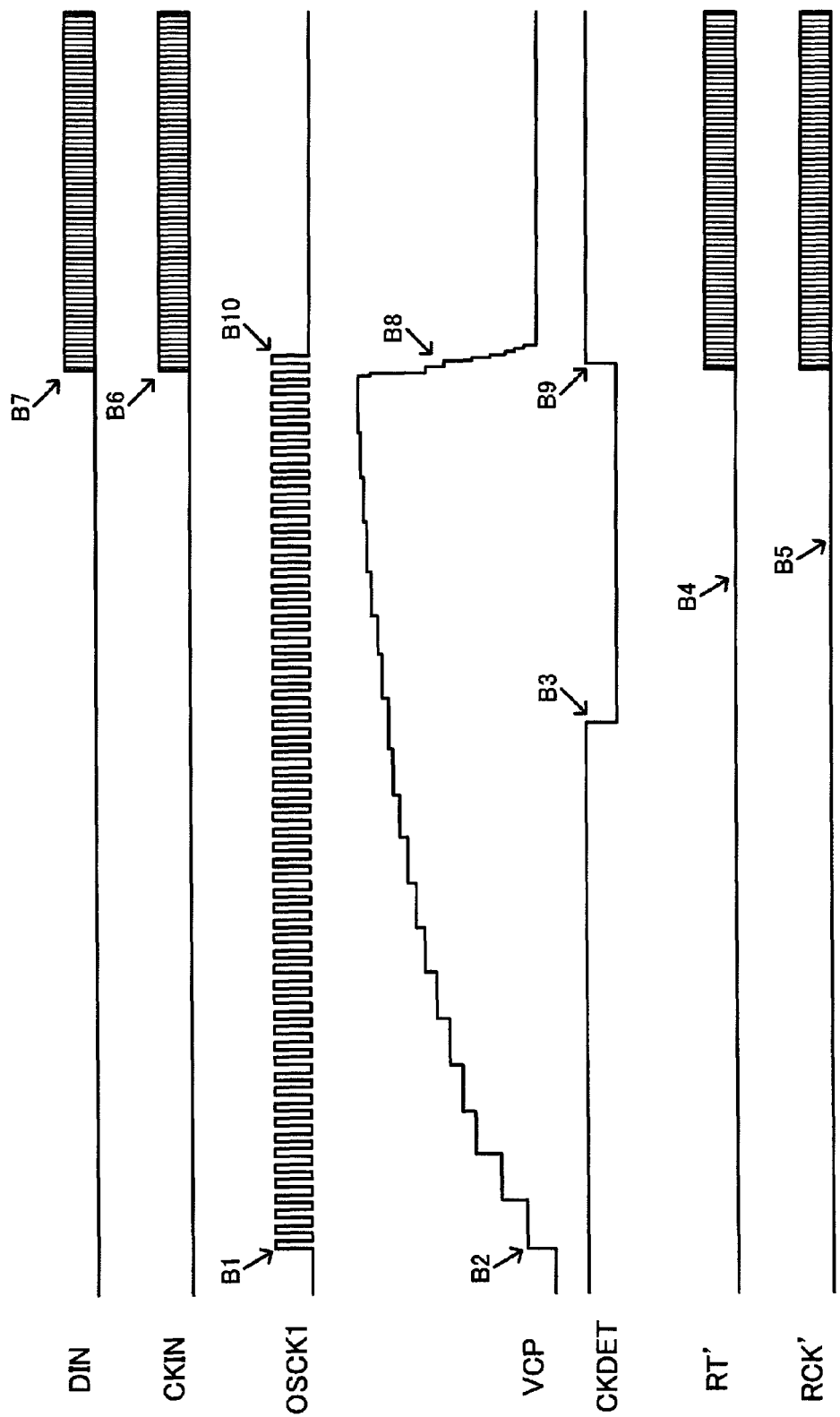
FIG. 10 shows a signal waveform example illustrative of the overall operation according to one embodiment of the invention.

FIG. 10 shows a signal waveform example illustrative of the overall operation according to this embodiment. When the enable signal OSE shown in FIG. 9 is activated at a timing B1 in FIG. 10, the free-running oscillation circuit 72 shown in FIG. 6 starts the oscillation operation, and the free-running clock signal generation circuit 70 outputs the free-running clock signal OSCK1. Therefore, the voltage VCP of the charge-pump node NCP of the clock signal detection circuit 80 shown in FIGS. 7A and 7B increases, as indicated by B2 in FIG. 10.

When the voltage VCP has exceeded the first threshold voltage VTH1 of the voltage detection circuit 86, the detection signal CKDET is set at the L level, as indicated by B3 in FIG. 10. As a result, the free-running clock signal OSCK1 is supplied to the selectors SLC and SLD through the AND circuit ANC1 shown in FIG. 9, and the selectors SLC and SLD select the free-running clock signal OSCK1. Therefore, the free-running clock signal OSCK1 is supplied to the logic circuit block 30. In this case, since the detection signal CKDET is set at the L level, the output signals RT and RCK from the logic circuit block 30 are masked so that the signals RT' and RCK' fixed at the L level are output to the circuit in the subsequent stage, as indicated by B4 and B5 in FIG. 10.

When reception of the received clock signal CKIN and the received serial data DIN has started, as indicated by B6 and B7 in FIG. 10, the voltage VCP of the charge-pump node NCP decreases, as indicated by B8.

When the voltage VCP has exceeded the second threshold voltage VTH2 of the voltage detection circuit 86, the detection signal CKDET is set at the H level, as indicated by B9 in FIG. 10. Therefore, the free-running clock signal OSCK1 is masked by the AND circuit ANC1 shown in FIG. 9, and the selectors SLC and SLD respectively select the received clock signal CKIN and the received serial data DIN. As a result, the received clock signal CKIN and the received serial data DIN are supplied to the logic circuit block 30.

In this case, when the frequency of the received clock signal CKIN is higher than the frequency FM, the frequency detection circuit 100 shown in FIG. 9 sets the operation stop signal STP at the H level. This causes the enable signal OSE to be set at the L level so that the free-running clock signal generation circuit 70 stops the oscillation operation and the clock signal OSCK1 is stopped, as indicated by B10.

5. Fourth Configuration Example

Figure 11:
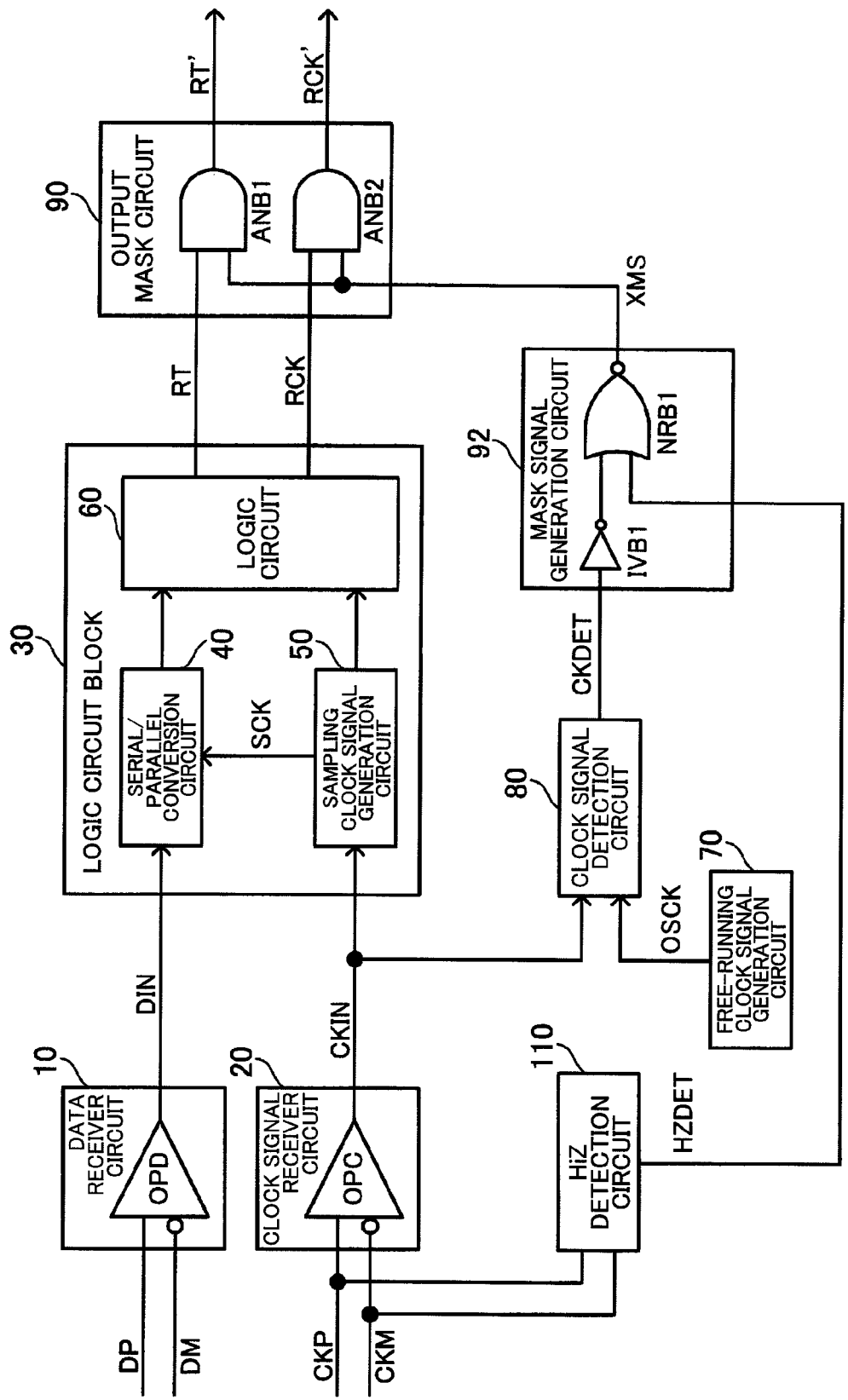
FIG. 11 shows a fourth configuration example of a high-speed serial interface circuit according to one embodiment of the invention.

FIG. 11 shows a fourth configuration example according to this embodiment. In FIG. 11, a HiZ detection circuit 110 and a mask signal generation circuit 92 are provided in addition to the configuration shown in FIG. 1. Note that a modification may be made in which the configuration shown in FIG. 3 or 4 or the like is combined with the configuration shown in FIG. 11.

The HiZ detection circuit 110 (high impedance state detection circuit) is a circuit that detects a high impedance state. Specifically, the HiZ detection circuit 110 detects the high impedance state of the CKP and CKM clock signal lines (first and second clock signal lines) that form the differential clock signal lines. For example, when the transmitter circuit does not drive the CKP and CKM clock signal lines so that the CKP and CKM clock signal lines are set in a high impedance state, the HiZ detection circuit 110 detects the high impedance state of the CKP and CKM clock signal lines. The HiZ detection circuit 110 then activates (H level) a high impedance state detection signal HZDET.

The mask signal generation circuit 92 includes an inverter circuit IVB1 and a NOR circuit NRB1. The detection signal CKDET from the clock signal detection signal 80 and the detection signal HZDET from the HiZ detection circuit 110 are input to the mask signal generation circuit 92. The mask signal generation circuit 92 activates (L level) a mask signal XMS (negative logic) when the detection signal CKDET has been inactivated (L level) or the detection signal HZDET has been activated (H level).

The output mask circuit 90 masks the output signals RT and RCK from the logic circuit block 30 when the high impedance state of the CKP and CKM clock signal lines has been detected. Specifically, when the HiZ detection circuit 110 has detected the high impedance state of the CKP and CKM clock signal lines to set the detection signal HZDET at the H level and the mask signal generation circuit 92 has set the mask signal XMS at the L level, the output signals RT and RCK are masked by the AND circuits ANB1 and ANB2 so that the signals RT' and RCK' are fixed at the L level.

For example, when using only the method in which the clock signal detection circuit 80 detects that the clock signals are not transferred through the clock signal lines, when the transmitter circuit does not drive the clock signal lines so that the clock signal lines are set in a high impedance state, the unstable output signals RT and RCK may not be masked.

In FIG. 11, since the HiZ detection circuit 110 is provided, the output signals RT and RCK can be masked even if the transmitter circuit does not drive the CKP and CKM clock signal lines so that the CKP and CKM clock signal lines are set in a high impedance state, in addition to the case where the clock signals are not transferred through the clock signal lines. Therefore, malfunction of the circuit in the subsequent stage can be prevented.

Figure 12A:
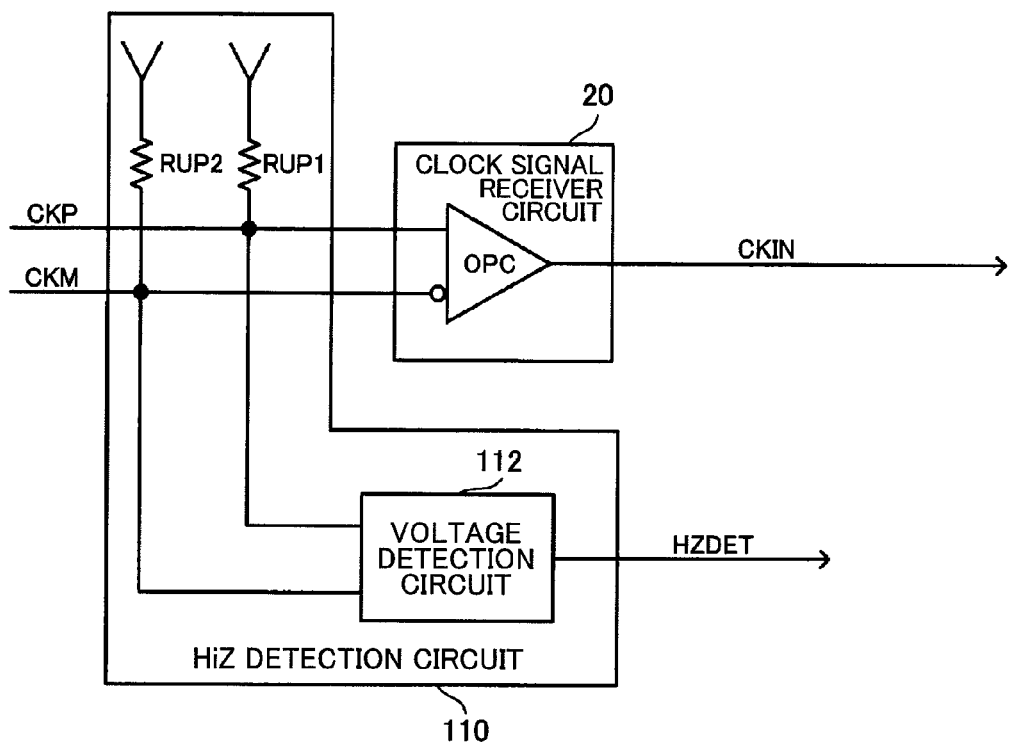
FIGS. 12A and 12B show a configuration example of a HiZ detection circuit and a view illustrative of the HiZ detection circuit.

FIG. 12A shows a configuration example of the HiZ detection circuit 110. The HiZ detection circuit 110 (high impedance state detection circuit) includes a first pull-up resistor RUP1 connected to the CKP clock signal line (first clock signal line), and a second pull-up resistor RUP2 connected to the CKM clock signal line (second clock signal line). The pull-up resistors RUP1 and RUP2 are provided between the power supply VDD and the CKP and CKM clock signal lines, respectively.

Figure 12B:
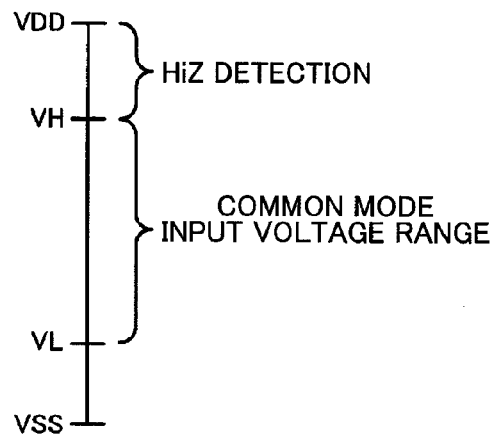

The HiZ detection circuit 110 includes a voltage detection circuit 112. When the minimum voltage of the common-mode input voltage range of the clock signal receiver circuit 20 is referred to as VL and the maximum voltage of the common-mode input voltage range of the clock signal receiver circuit 20 is referred to as VH, the voltage detection circuit 112 detects whether or not the voltages of the CKP and CKM clock signal lines have exceeded the maximum voltage VH. For example, when the range between the voltage VL and the voltage VH is the common-mode input voltage range (see FIG. 12B), the voltage detection circuit 112 activates a detection signal HZDET when the voltages of the CKP and CKM clock signal lines are higher than the voltage VH (i.e., between the voltage VH and the voltage VDD).

Specifically, when the clock signals CKP and CKM are transferred through the clock signal lines, small-amplitude differential signals in the common-mode input voltage range between the voltage VL and the voltage VH are input to the clock signal receiver circuit 20. Therefore, when the voltages of the CKP and CKM clock signal lines are higher than the maximum voltage VH, it may be determined that the clock signals are not transferred through the clock signal lines. Since the clock signal lines are pulled up to the power supply voltage VDD by the pull-up resistors RUP1 and RUP2 when the transmitter circuit does not drive the clock signal lines, the high impedance state of the CKP and CKM clock signal lines can be detected by detecting the pulled-up voltage using the voltage detection circuit 112.

Figure 13A:
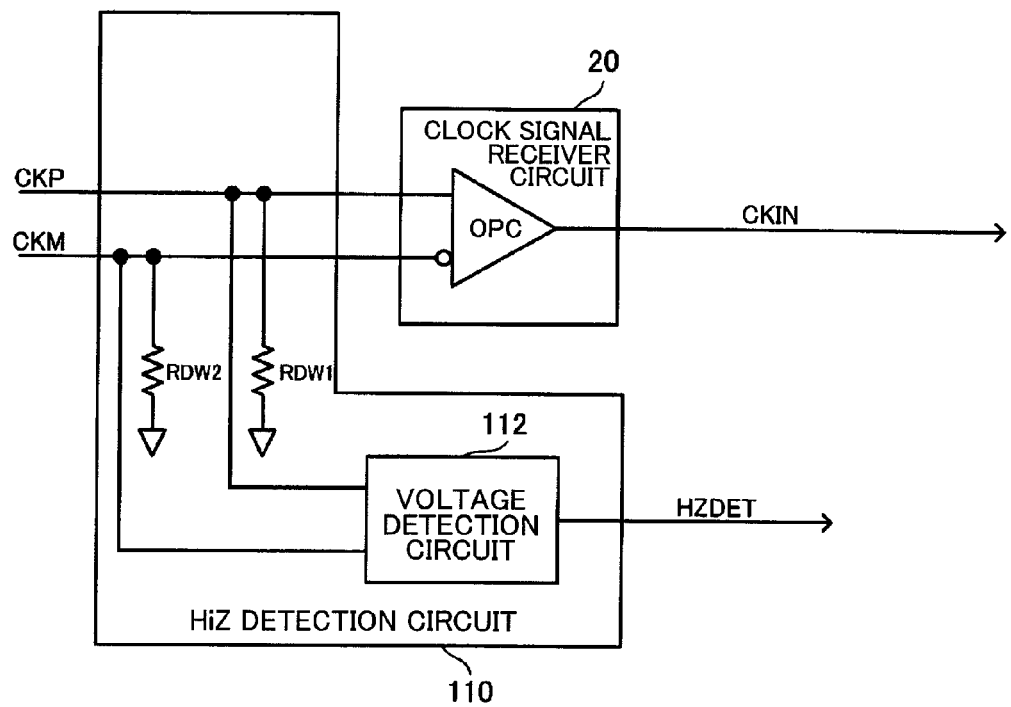
FIGS. 13A and 13B show another configuration example of a HiZ detection circuit and a view illustrative of the HiZ detection circuit.

Note that the HiZ detection circuit 110 is not limited to the configuration shown in FIG. 12A. Various modifications and variations may be made. FIG. 13A shows another configuration example of the HiZ detection circuit 110.

The HiZ detection circuit 110 shown in FIG. 13A includes a first pull-down resistor RDW1 connected to the CKP clock signal line, and a second pull-down resistor RDW2 connected to the CKM clock signal line. The pull-down resistors RDW1 and RDW2 are provided between the power supply VSS and the CKP and CKM clock signal lines, respectively.

Figure 13B:
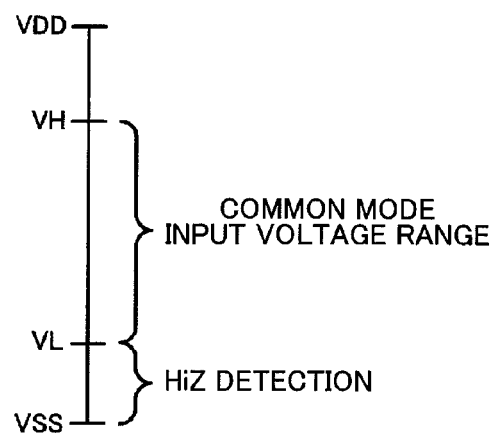

In the HiZ detection circuit 110 shown in FIG. 13A, the voltage detection circuit 112 detects whether or not the voltages of the CKP and CKM clock signal lines have become lower than the minimum voltage VL of the common-mode input voltage range. For example, when the range between the voltage VL and the voltage VH is the common-mode input voltage range (see FIG. 13B), the voltage detection circuit 112 activates the detection signal HZDET when the voltages of the CKP and CKM clock signal lines are lower than the voltage VL (i.e., between the voltage VSS and the voltage VL).

Specifically, since the common-mode input voltage range is between the voltage VL and the voltage VH, when the voltages of the CKP and CKM clock signal lines are lower than the voltage VL, it may be determined that the clock signals CKP and CKM are not transferred through the clock signal lines. Since the clock signal lines are pulled down to the power supply voltage VSS by the pull-down resistors RDW1 and RDW2 when the transmitter circuit does not drive the CKP and CKM clock signal lines, the high impedance state of the CKP and CKM clock signal lines can be detected by detecting the pulled-down voltage using the voltage detection circuit 112.

Figure 14A:
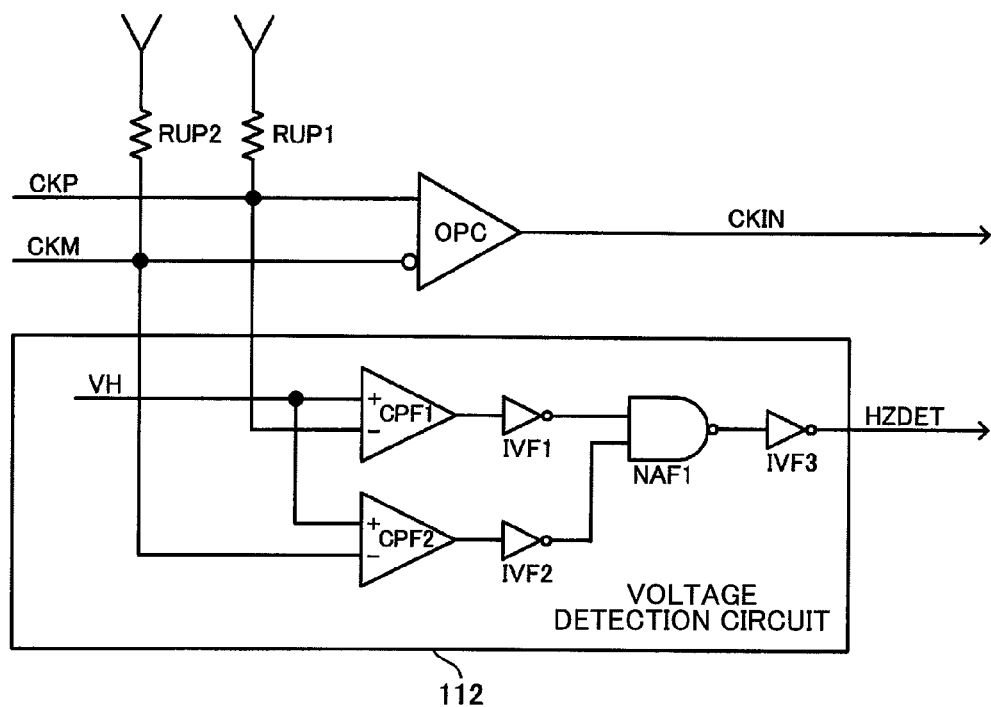
FIGS. 14A and 14B show a configuration example of a voltage detection circuit included in a HiZ detection circuit and a view illustrative of the voltage detection circuit.

FIG. 14A shows a configuration example of the voltage detection circuit 112. Note that the voltage detection circuit 112 is not limited to the configuration shown in FIG. 14A. Various modifications and variations may be made.

The voltage detection circuit 112 shown in FIG. 14A includes comparators CPF1 and CPF2, inverter circuits IVF1, IVF2, and IVF3, and a NAND circuit NAF1. The comparator CPF1 compares the maximum voltage VH of the common-mode input voltage range with the voltage of the CKP clock signal line, and outputs an L level when the voltage of the CKP clock signal line has exceeded the maximum voltage VH. The comparator CPF2 compares the maximum voltage VH with the voltage of the CKM clock signal line, and outputs an L level when the voltage of the CKM clock signal line has exceeded the maximum voltage VH. Therefore, when the voltages of the CKP and CKM clock signal lines have exceeded the maximum voltage VH, the voltages of first and second input terminals of the NAND circuit NAF1 are set at the H level so that the detection signal HZDET is set at the H level (active). This enables detection of the high impedance state of the CKP and CKM clock signal lines.

Figure 14B:
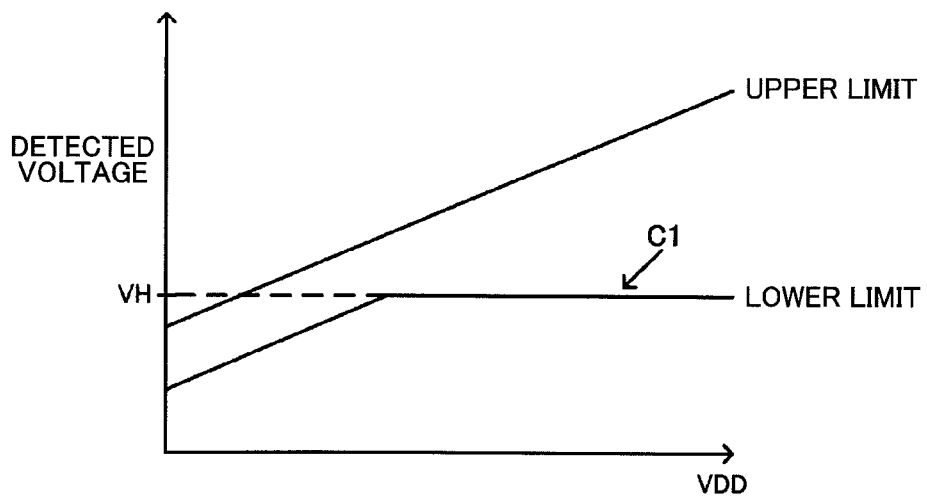

According to the voltage detection circuit 112 shown in FIG. 14A, even if the power supply voltage has changed, as shown in FIG. 14B, the lower limit of the detected voltage is constant, as indicated by C1. Therefore, a high impedance state can be appropriately detected.

When using the HiZ detection circuit 110 having the configuration shown in FIG. 13A, the comparators CPF1 and CPF2 of the voltage detection circuit 112 shown in FIG. 14A may compare the voltages of the CKP and CKM clock signal lines with the minimum voltage VL of the common-mode input voltage range.

6. Fifth Configuration Example

Figure 15:
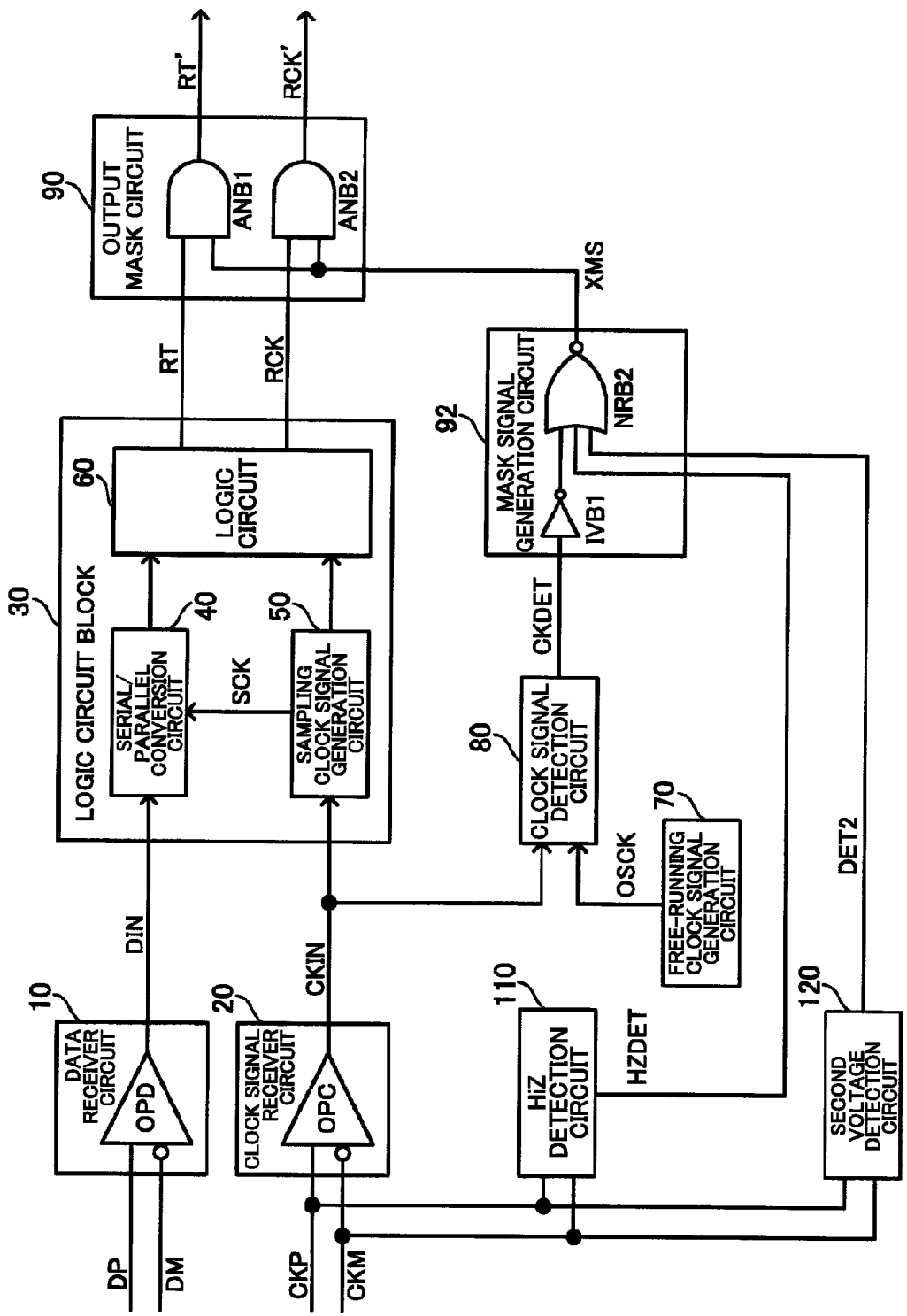
FIG. 15 shows a fifth configuration example of a high-speed serial interface circuit according to one embodiment of the invention.

FIG. 15 shows a fifth configuration example according to this embodiment. In FIG. 15, a second voltage detection circuit 120 is provided in addition to the configuration shown in FIG. 11. Note that a modification may be made in which the configuration shown in FIG. 3 or 4 or the like is combined with the configuration shown in FIG. 15.

The second voltage detection circuit 120 detects whether or not the voltages of the CKP and CKM clock signal lines have become lower than the minimum voltage VL of the common-mode input voltage range. When the voltages of the CKP and CKM clock signal lines have become lower than the minimum voltage VL, the second voltage detection circuit 120 sets a detection signal DET2 at the H level (active).

The mask signal generation circuit 92 includes the inverter circuit IVB1 and a NOR circuit NRB2. The detection signal CKDET from the clock signal detection signal 80, the detection signal HZDET from the HiZ detection circuit 110, and the detection signal DET2 from the second voltage detection circuit 120 are input to the mask signal generation circuit 92. Therefore, when the detection signal DET2 has been set at the H level, the mask signal XMS is set at the L level (active).

The output mask circuit 90 masks the output signals RT and RCK from the logic circuit block 30 when the voltages of the CKP and CKM clock signal lines have become lower than the minimum voltage VL. Specifically, when the second voltage detection circuit 120 has detected that the voltages of the CKP and CKM clock signal lines have become lower than the minimum voltage VL and set the detection signal DET2 at the H level, the mask signal generation circuit 92 sets the mask signal XMS at the L level. As a result, the output signals RT and RCK are masked by the AND circuits ANB1 and ANB2 so that the signals RT' and RCK' are fixed at the L level.

For example, when using only the method in which the HiZ detection circuit 110 shown in FIG. 12A detects a high impedance state, it is impossible to detect a situation in which the transmitter circuit has driven the clock signal lines toward the power supply voltage VSS by a drive capability higher than the pull-up capabilities of the pull-up resistors RUP1 and RUP2 shown in FIG. 12A so that the CKP and CKM clock signal lines have been set at the L level. Therefore, the output signals RT and RCK that have become unstable state due to noise superimposed on the CKP and CKM clock signal lines and the like may not be masked.

In FIG. 15, since the second voltage detection circuit 120 is provided, the output signals RT and RCK can be masked even if the transmitter circuit has driven the CKP and CKM clock signal lines so that the CKP and CKM clock signal lines are set at the L level, in addition to the case where the clock signal lines are set in a high impedance state. Therefore, malfunction of the circuit in the subsequent stage can be prevented.

When the HiZ detection circuit 110 includes the pull-down resistors RDW1 and RDW2 (see FIG. 13A), the second voltage detection circuit 120 may detect whether or not the voltages of the CKP and CKM clock signal lines have exceeded the maximum voltage VH of the common-mode input voltage range. The output mask circuit 90 may mask the output signals RT and RCK from the logic circuit block 30 when the voltages of the clock signal lines have exceeded the maximum voltage VH.

For example, when using only the method in which the HiZ detection circuit 110 shown in FIG. 13A detects a high impedance state, it is impossible to detect a situation in which the transmitter circuit has driven the clock signal lines toward the power supply voltage VDD by a drive capability higher than the pull-down capabilities of the pull-down resistors RDW1 and RDW2 shown in FIG. 13A so that the CKP and CKM clock signal lines have been set at the H level.

On the other hand, if the second voltage detection circuit 120 detects whether or not the voltages of the CKP and CKM clock signal lines have exceeded the maximum voltage VH, the output signals RT and RCK can be masked even if the transmitter circuit has driven the CKP and CKM clock signal lines so that the CKP and CKM clock signal lines are set at the H level, in addition to the case where the clock signal lines are set in a high impedance state. Therefore, malfunction of the circuit in the subsequent stage can be prevented.

7. Sampling Clock Signal Generation Circuit

Figure 16:
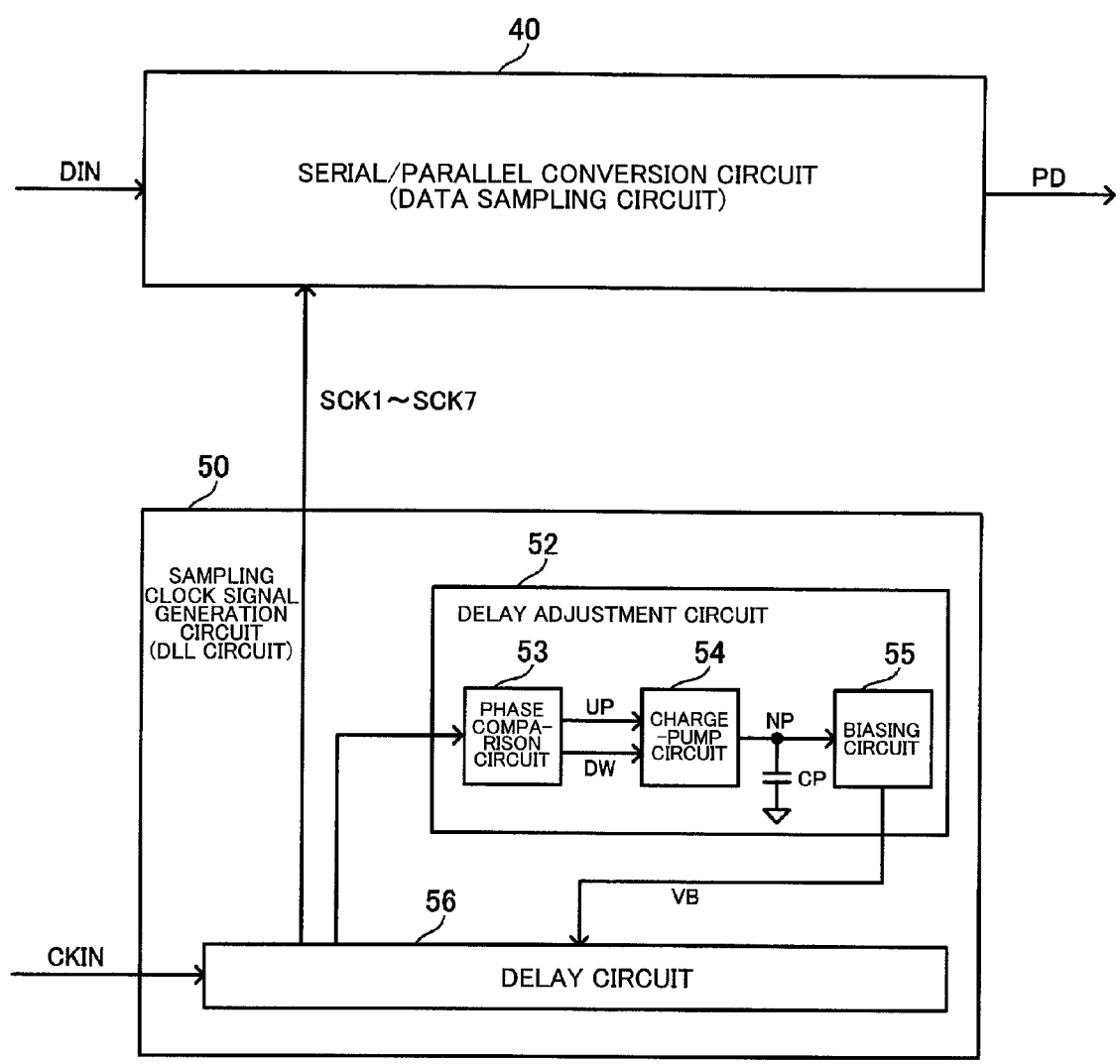
FIG. 16 shows a configuration example of a sampling clock signal generation circuit.

FIG. 16 shows a configuration example of the sampling clock signal generation circuit 50. Note that the sampling clock signal generation circuit 50 according to this embodiment is not limited to the configuration shown in FIG. 16. Various modifications may be made such as omitting some of the elements or adding other elements. For example, a sampling clock signal generation circuit 50 that generates a single-phase sampling clock signal may also be employed.

The sampling clock signal generation circuit 50 (DLL circuit) shown in FIG. 16 includes a delay adjustment circuit 52 and a delay circuit 56.

Figure 17:
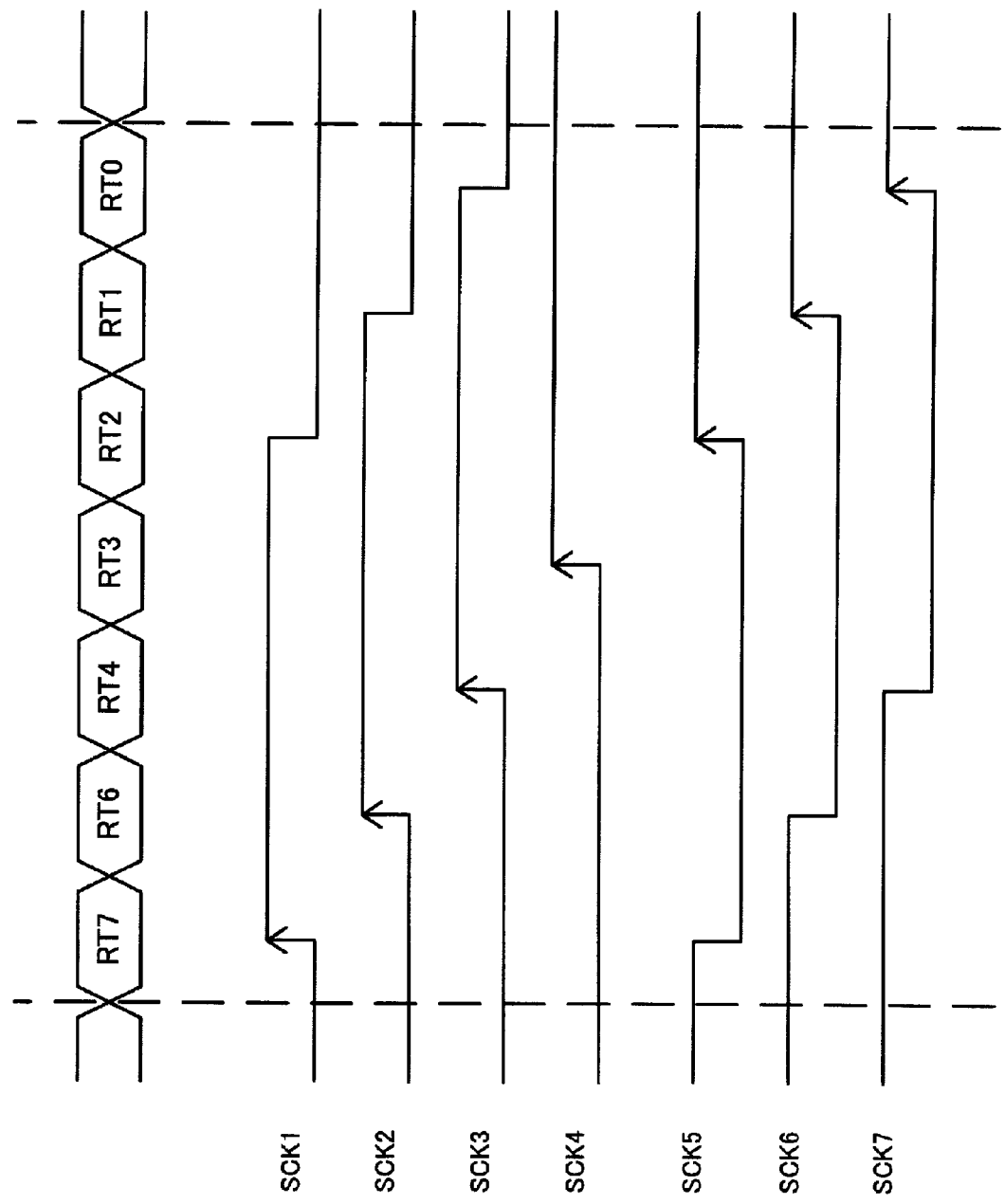
FIG. 17 shows a signal waveform example illustrative of the operations of a sampling clock signal generation circuit and a serial/parallel conversion circuit.

The delay circuit 56 is a circuit that receives the received clock signal CKIN and delays the received clock signal CKIN. As shown in FIG. 17, the delay circuit 56 generates multi-phase sampling clock signals SCK1 to SCK7 that differ in phase. Specifically, the delay circuit 56 includes a plurality of stages of cascaded delay buffers (delay units). The delay circuit 56 delays the clock signal CKIN using the delay buffers, and outputs multi-phase sampling clock signals SCK1 to SKC7 from output nodes of the delay buffers through buffers or the like.

The delay adjustment circuit 52 adjusts the delay time of the delay circuit 56. Specifically, the delay adjustment circuit 52 performs a phase comparison process that generates the multi-phase sampling clock signals SCK1 to SCK7 of which the clock signal delay time has been locked. The delay adjustment circuit 52 includes a phase comparison circuit 53, a charge-pump circuit 54, and a biasing circuit 55.

The phase comparison circuit 53 performs a phase comparison process that locks the multi-phase clock signal delay time of the delay circuit 56. Specifically, the phase comparison circuit 53 locks the delay time so that the phase difference between the rising edges of the sampling clock signal is fixed, for example. The phase comparison circuit 53 locks the delay time so that harmonic lock does not occur.

More specifically, several clock signals among clock signals (multi-phase clock signals or intermediate output clock signals) output from the delay buffers of the delay circuit 56 are input to the phase comparison circuit 53. The phase comparison circuit 53 generates internal signals based on the clock signals, generates signals UP and DW based on the internal signals, and outputs the signals UP and DW to the charge-pump circuit 54.

The charge-pump circuit 54 performs a charge-pump operation for a charge-pump node NP based on the signals UP and DW from the phase comparison circuit 53. The biasing circuit 55 generates a delay adjustment bias voltage VB based on a charge-pump voltage of the node NP, and outputs the bias voltage VB to the delay circuit 56. The delay circuit 56 delays the clock signal CKIN by a clock signal delay time corresponding to the bias voltage VB from the biasing circuit 55 to generate the multi-phase sampling clock signals SCK1 to SCK7, and outputs the sampling clock signals SCK1 to SCK7 to the serial/parallel conversion circuit 40.

As shown in FIG. 17, the serial/parallel conversion circuit 40 samples bits (RT7, RT6, RT4, RT3, RT2, RT1, and RT0) of the received serial data DIN at the rising edges of the multi-phase sampling clock signals SCK1 to SCK7. The serial/parallel conversion circuit 40 converts the received serial data DIN into seven-bit parallel data PD (RT7 to RT0), and outputs the parallel data PD to the circuit in the subsequent stage.

When using the sampling clock signal generation circuit 50 having the configuration shown in FIG. 16, in order to appropriately sample the received serial data DIN using the sampling clock signals SCK1 to SCK7, the rising edges (or falling edges) of the sampling clock signals SCK1 to SCK7 must be set at about the center of each bit of the received serial data DIN. Therefore, the delay time of the delay circuit 56 may be finely adjusted, or a data delay circuit or a clock signal delay circuit is provided between the data receiver circuit 10 (or clock signal receiver circuit 20) and the serial/parallel conversion circuit 40 to finely adjust the data or clock signal delay time.

However, when the high-speed serial interface circuit has been enabled and allowed to stand for a long time in a state in which serial data or a clock signal is not transferred, the delay time of the delay circuit is shifted from the initial setting value due to the above-mentioned NBTI phenomenon. Therefore, the rising edges of the sampling clock signals SCK1 to SCK7 shown in FIG. 17 are shifted from the center of each bit of the received serial data DIN, whereby a sampling error occurs. When such a shift in delay time is taken into consideration during design, the design margin decreases.

According to this embodiment, since the free-running clock signal is input to the logic circuit block 30 when serial data or a clock signal is not transferred, the NBTI phenomenon can be reduced so that a sampling error and the like can be prevented.

8. Electronic Instrument

Figure 18:
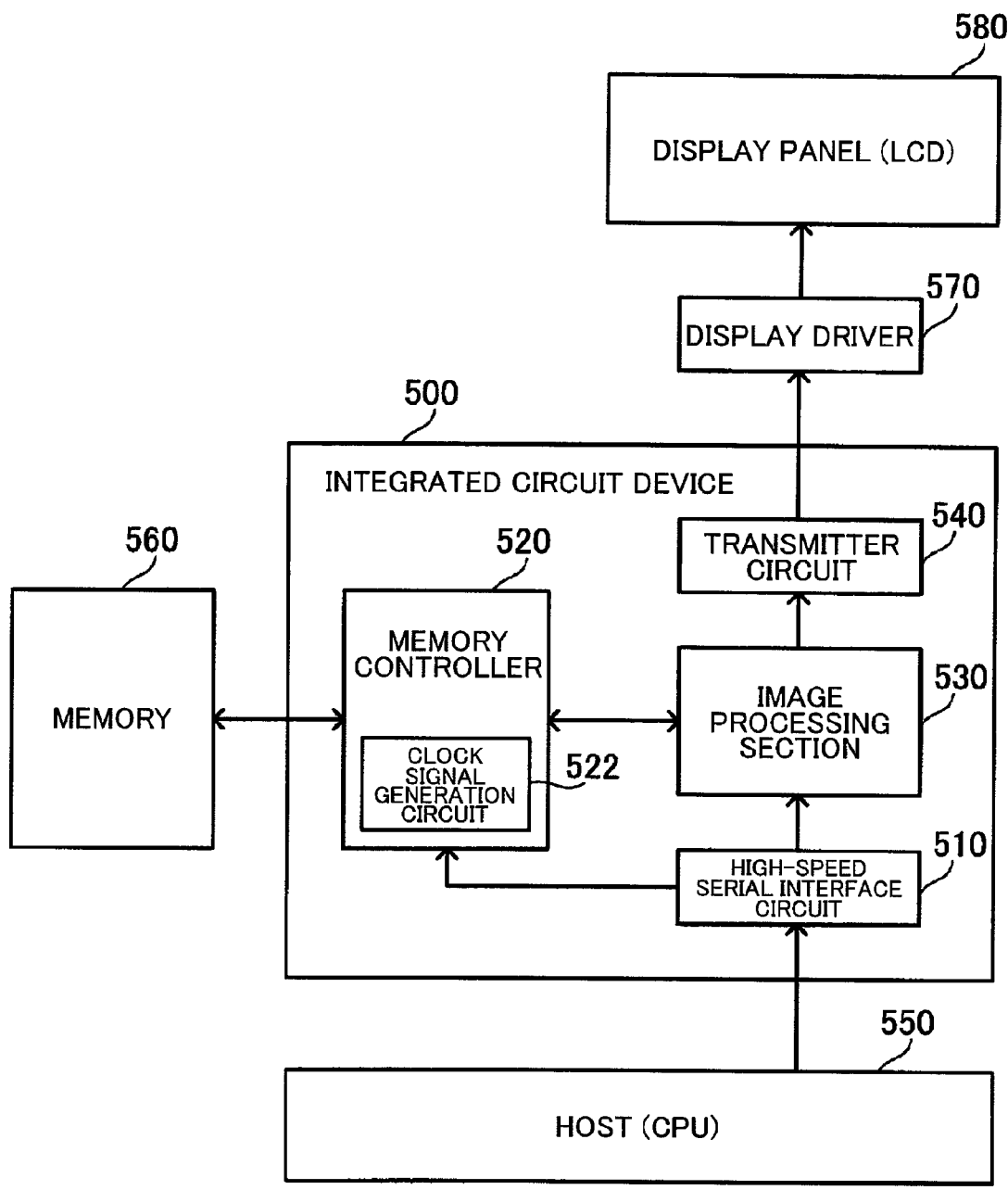
FIG. 18 shows a configuration example of an electronic instrument.

FIG. 18 shows an example of an electronic instrument using a high-speed serial interface circuit 510 according to the above-described embodiment. FIG. 18 shows a configuration example of an electronic instrument (e.g., a large-screen television or a portable telephone) including a display panel 580 (e.g., LCD).

Serial data and a clock signal from a host 550 are transmitted to an integrated circuit device 500 through LVDS differential signals (serial bus), and received by a high-speed serial interface circuit 510 (LVDS receiver circuit). The high-speed serial interface circuit 510 supplies the clock signal transferred from the host 550 (or a clock signal obtained by multiplying the clock signal) to a memory controller 520. The high-speed serial interface circuit 510 supplies image data (i.e., received serial data) transferred from the host 550 to an image processing section 530.

The image processing section 530 processes (e.g., applies a gamma correction to) the image data received from the host 550. The image processing section 530 writes or reads image data before or after being processed into or from a memory 560 (device that operates based on data or a clock signal received by the high-speed serial interface circuit in a broad sense). A high-speed memory such as an SDRAM or a DDR SDRAM may be used as the memory 560. The memory controller 520 (SDRAM) controls writing or reading of data into or from the memory 560.

A clock signal generation circuit 522 of the memory controller 520 generates a clock signal for sampling data read from the memory 560 based on the clock signal from the high-speed serial interface circuit 510, for example. The clock signal generation circuit 522 may generate a clock signal necessary for writing data into the memory 560.

The image data processed by the image processing section 530 is transmitted to a display driver 570 (device that operates based on data or a clock signal received by the high-speed serial interface circuit) by a transmitter circuit 540. The display driver 570 drives the display panel 580 (e.g., LCD) based on the received image data to display an image corresponding to the image data.

Note that the electronic instrument to which the high-speed serial interface circuit according to the above-described embodiment is applied is not limited to the configuration shown in FIG. 18. It suffices that the electronic instrument include at least a device (e.g., memory, display driver, or display panel) that operates based on data or a clock signal received by the high-speed serial interface circuit. Specific examples of the electronic instrument to which the above embodiment may be applied include an information processing device, a portable information terminal, an AV apparatus, a portable AV apparatus, a game device, a portable game device, and the like.

Although some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term cited with a different term having a broader meaning or the same meaning at least once in the specification and the drawings can be replaced by the different term in any place in the specification and the drawings. The configurations and the operations of the high-speed serial interface circuit and the electronic instrument are not limited to those described relating to the above embodiments. Various modifications and variations may be made.

What is claimed is:

1. A serial interface circuit comprising:
   a data receiver circuit that receives differential-signal serial data transferred through differential data signal lines, and outputs received serial data;
   a clock signal receiver circuit that receives differential clock signals transferred through differential clock signal lines, and outputs a received clock signal;
   a logic circuit block that includes a serial/parallel conversion circuit and receives the received serial data from the data receiver circuit and the received clock signal from the clock signal receiver circuit, the serial/parallel conversion circuit sampling the received serial data based on a sampling clock signal generated using the received clock signal, and converting the received serial data into parallel data;
   a clock signal generation circuit that generates an internal clock signal, and output the internal clock signal;
   a clock signal detection circuit that compares the received clock signal with the internal clock signal to detect whether or not the differential clock signals are transferred through the differential clock signal lines; and
   an output mask circuit that masks the parallel data from the logic circuit block to prevent the parallel data from being transmitted to a circuit in a subsequent stage of the output mask circuit when the clock signal detection circuit has detected the differential clock signals are not transferred through the differential clock signal lines.

2. The serial interface circuit as defined in claim 1,
the clock signal detection circuit comparing a frequency of the received clock signal with the frequency of the internal clock signal, and detecting that the differential clock signals are not transferred through the differential clock signal lines when the frequency of the received clock signal is lower than the frequency of the internal clock signal.

3. The serial interface circuit as defined in claim 2,
when the frequency of the internal clock signal is referred to as FC, the minimum frequency of a frequency range of the differential clock signals transferred through the differential clock signal lines is referred to as FL, and the maximum frequency of the frequency range of the differential clock signals transferred through the differential clock signal lines is referred to as FH, the clock signal generation circuit generating the internal clock signal having the frequency FC that satisfies the relationship FC<FL.

4. The serial interface circuit as defined in claim 1, the clock signal receiver circuit receiving the internal clock signal from the clock signal generation circuit, and outputting the internal clock signal to the logic circuit block instead of the received clock signal when the clock signal detection circuit has detected that the differential clock signals are not transferred through the differential clock signal lines.

5. The serial interface circuit as defined in claim 4,
the data receiver circuit receiving the internal clock signal from the clock signal generation circuit, and outputting the internal clock signal to the logic circuit block instead of the received serial data when the clock signal detection circuit has detected that the differential clock signals are not transferred through the differential clock signal lines.

6. The serial interface circuit as defined in claim 1, further comprising:
a frequency detection circuit that detects the frequency of the received clock signal, and activates an operation stop signal supplied to the clock signal generation circuit when the frequency of the received clock signal has exceeded a given frequency FM.

7. The serial interface circuit as defined in claim 1, the clock signal detection circuit including:
a charge circuit that charges a charge-pump node connected to a first capacitor by a time constant corresponding to the frequency of the internal clock signal;
a discharge circuit that discharges the charge-pump node by a time constant corresponding to the frequency of the received clock signal; and
a voltage detection circuit that detects the voltage of the charge-pump node.

8. The serial interface circuit as defined in claim 7,
the discharge circuit including:
a first-conductivity-type first transistor that is provided between a first intermediate node connected to a second capacitor and a first power supply and is turned ON when the received clock signal is set at a first voltage level; and
a first-conductivity-type second transistor that is provided between the charge-pump node and the first intermediate node and is turned ON when the received clock signal is set at a second voltage level; and the charge circuit including:
a second-conductivity-type third transistor that is provided between a second intermediate node connected to a third capacitor and the charge-pump node and is turned ON when the internal clock signal is set at the second voltage level; and
a second-conductivity-type fourth transistor that is provided between a second power supply and the second intermediate node and is turned ON when the internal clock signal is set at the first voltage level.

9. The serial interface circuit as defined in claim 7,
the voltage detection circuit including a Schmidt trigger circuit.

10. The serial interface circuit as defined in claim 1, further comprising:
a high impedance state detection circuit that detects a high impedance state of a first clock signal line and a second clock signal line that form the differential clock signal lines,
the output mask circuit masking the output signal from the logic circuit block when the high impedance state detection circuit has detected the high impedance state of the first clock signal line and the second clock signal line.

11. The serial interface circuit as defined in claim 10,
the high impedance state detection circuit including:
a first pull-up resistor connected to the first clock signal line;
a second pull-up resistor connected to the second clock signal line; and
a voltage detection circuit, when the minimum voltage of a common-mode input voltage range of the clock signal receiver circuit is referred to as VL and the maximum voltage of the common-mode input voltage range of the clock signal receiver circuit is referred to as VH, the voltage detection circuit detecting whether or not the voltages of the first clock signal line and the second clock signal line have exceeded the maximum voltage VH; and
the output mask circuit masking the output signal from the logic circuit block when the voltages of the first clock signal line and the second clock signal line have exceeded the maximum voltage VH.

12. The serial interface circuit as defined in claim 11, further comprising:
a second voltage detection circuit that detects whether or not the voltages of the first clock signal line and the second clock signal have become lower than the minimum voltage VL,
the output mask circuit masking the output signal from the logic circuit block when the voltages of the first clock signal line and the second clock signal have become lower than the minimum voltage VL.

13. The serial interface circuit as defined in claim 10,
the high impedance state detection circuit including:
a first pull-down resistor connected to the first clock signal line;
a second pull-down resistor connected to the second clock signal line; and
a voltage detection circuit, when the minimum voltage of a common-mode input voltage range of the clock signal receiver circuit is referred to as VL and the maximum voltage of the common-mode input voltage range of the clock signal receiver circuit is referred to as VH, the voltage detection circuit detecting whether or not the voltages of the first clock signal line and the second clock signal line have become lower than the minimum voltage VL; and
the output mask circuit masking the output signal from the logic circuit block when the voltages of the first clock signal line and the second clock signal line have become lower than the minimum voltage VL.

14. The serial interface circuit as defined in claim 13, further comprising:
a second voltage detection circuit that detects whether or not the voltages of the first clock signal line and the second clock signal have exceeded the maximum voltage VH,
the output mask circuit masking the output signal from the logic circuit block when the voltages of the first clock signal line and the second clock signal have exceeded the maximum voltage VH.

15. An electronic instrument comprising:
the serial interface circuit as defined in claim 1; and
a device that operates based on data or a clock signal received by the serial interface circuit.

16. An electronic instrument comprising:
the serial interface circuit as defined in claim 2; and
a device that operates based on data or a clock signal received by the serial interface circuit.

17. An electronic instrument comprising:
the serial interface circuit as defined in claim 4; and
a device that operates based on data or a clock signal received by the serial interface circuit.

18. An electronic instrument comprising:
the serial interface circuit as defined in claim 6; and
a device that operates based on data or a clock signal received by the serial interface circuit.

19. An electronic instrument comprising:
the serial interface circuit as defined in claim 7; and
a device that operates based on data or a clock signal received by the serial interface circuit.

20. An electronic instrument comprising:
the serial interface circuit as defined in claim 10; and
a device that operates based on data or a clock signal received by the serial interface circuit.

* * * * *